United States Patent
Nasu et al.

(10) Patent No.: US 7,110,784 B2
(45) Date of Patent: Sep. 19, 2006

(54) WIRELESS COMMUNICATION SYSTEM

(75) Inventors: Hidetada Nasu, Higashihiroshima (JP); Yoshitaka Arase, Otake (JP); Kousuke Kuroda, Higashihiroshima (JP); Hidenori Tatsumi, Higashihiroshima (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/496,459

(22) PCT Filed: Aug. 20, 2003

(86) PCT No.: PCT/JP03/10476

§ 371 (c)(1),
(2), (4) Date: May 24, 2004

(87) PCT Pub. No.: WO2004/019566

PCT Pub. Date: Mar. 4, 2004

(65) Prior Publication Data

US 2004/0266404 A1    Dec. 30, 2004

(30) Foreign Application Priority Data

Aug. 23, 2002   (JP) .............................. 2002-243058

(51) Int. Cl.
*H04B 7/00* (2006.01)
*H04Q 7/20* (2006.01)

(52) U.S. Cl. ...................... 455/517; 455/513; 455/510; 455/41.2; 455/41.3; 455/575.2

(58) Field of Classification Search ................ 455/418, 455/419, 420, 41.2, 41.3, 575.2, 95, 513, 455/510, 517
See application file for complete search history.

(56) References Cited

U.S. PATENT DOCUMENTS

| 6,339,706 | B1 * | 1/2002 | Tillgren et al. ............. 455/419 |
| 2002/0045454 | A1 * | 4/2002 | Iwata .......................... 455/450 |
| 2002/0068600 | A1 * | 6/2002 | Chihara et al. ............. 455/550 |
| 2002/0107041 | A1 * | 8/2002 | Mori ........................... 455/527 |
| 2002/0111140 | A1 * | 8/2002 | Kim ............................. 455/41 |
| 2002/0123314 | A1 * | 9/2002 | Kitazawa et al. ........... 455/134 |
| 2004/0058647 | A1 * | 3/2004 | Zhang et al. .............. 455/41.2 |
| 2005/0037818 | A1 * | 2/2005 | Seshadri et al. ......... 455/569.1 |
| 2005/0079899 | A1 * | 4/2005 | Hsiang ..................... 455/575.2 |

FOREIGN PATENT DOCUMENTS

JP          05122305 A   *  5/1993

(Continued)

*Primary Examiner*—Jean Gelin
*Assistant Examiner*—Huy Phan
(74) *Attorney, Agent, or Firm*—Wenderoth, Lind & Ponack, L.L.P.

(57) ABSTRACT

In response to the receipt of an inquiry sent out from a wireless headset 2 serving as a source wireless communication device, each of cellular phones 1a and 1b serving as prospective destinations determine whether it is currently able to provide a service, based on a current service provision environment concerning itself. Assuming that only the cellular phone 1a is currently able to provide a service, the cellular phone 1a sends an inquiry response to the presently received inquiry to the wireless headset 2. In response to the receipt of the inquiry response, the wireless headset 2 selects the cellular phone 1a which has returned the inquiry response as the destination. As a result, there is provided a wireless communication system which makes it possible for a source wireless communication device to establish a connection with a wireless communication device which is able to provide a service.

4 Claims, 24 Drawing Sheets

| | FOREIGN PATENT DOCUMENTS | | WO | WO 02/39484 A2 * | 5/2002 |
|----|----------|--------|----|------------------|--------|
| WO | 02/39484 | 5/2002 | | | |
| WO | 02/43325 | 5/2002 | * cited by examiner | | |

FIG. 16A
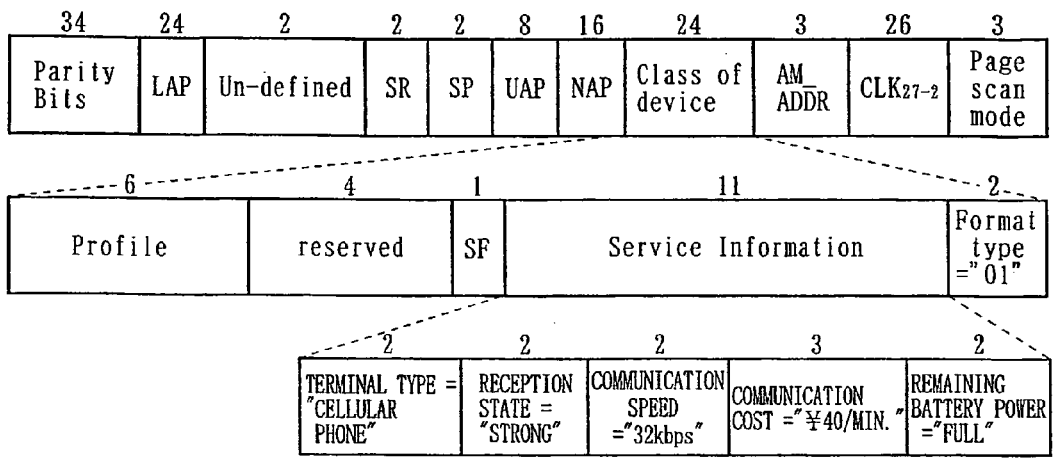
FIG. 16B
| Profile | ID |
|---------|--------|
| LAN | 000001 |
| DUP | 000010 |
| HSP | 000011 |
| ⋮ | ⋮ |
FIG. 16C
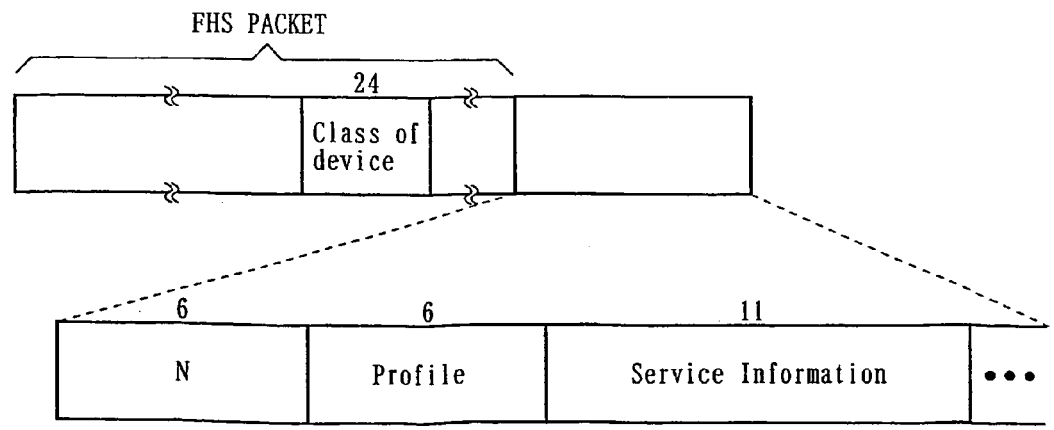

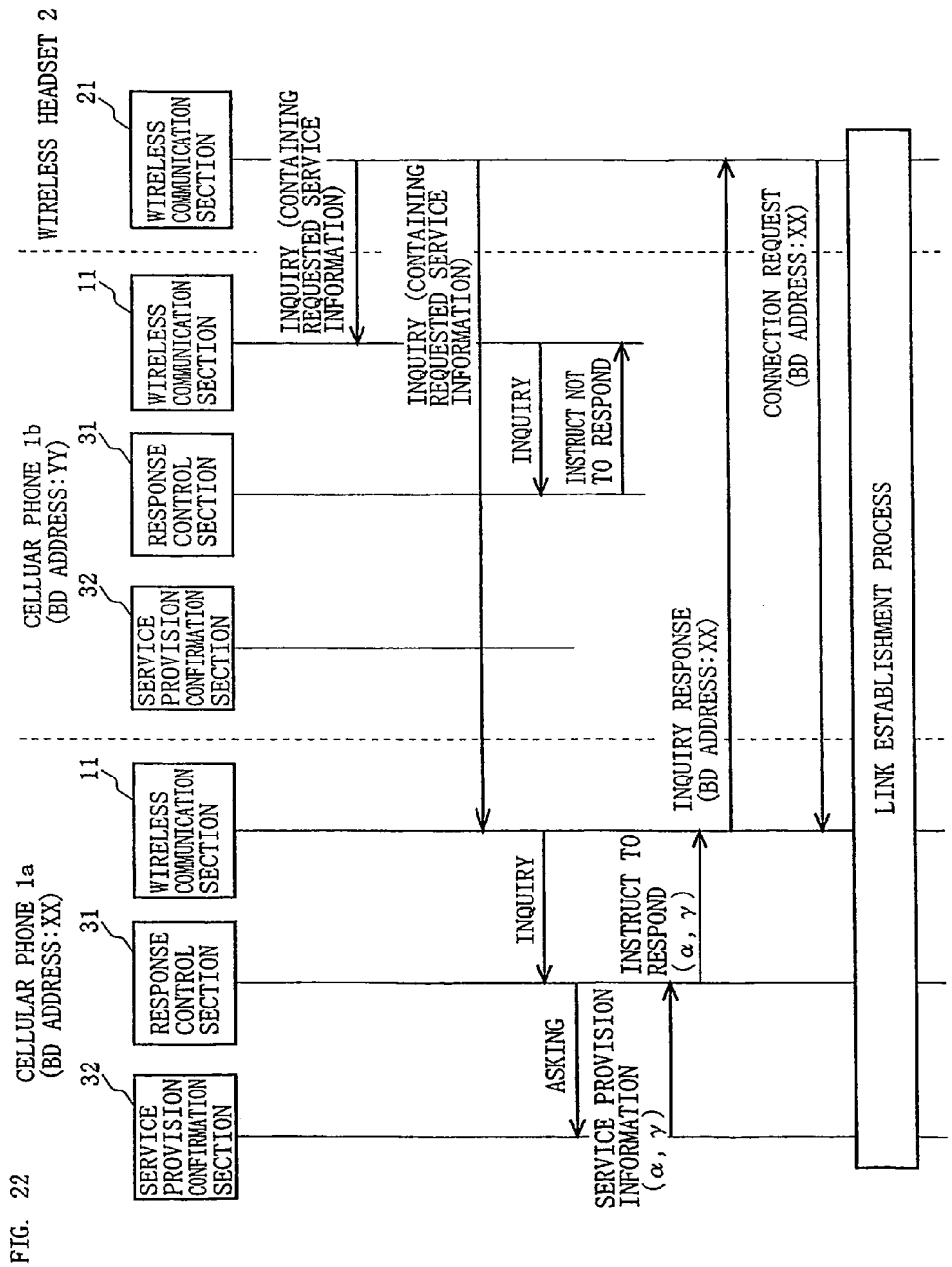

| LAP value | Profile | DESCRIPTION |
|---|---|---|
| 0x9E8B01 | LAN | LOCAL AREA NETWORK |
| 0x9E8B02 | DUP | DIAL-UP NETWORK |
| 0x9E8B03 | HSP | HEADSET |
| 0x9E8B04 | FAX | FACSIMILE |
| ⋮ | ⋮ | ⋮ |

| LAP value | Profile | DESCRIPTION |
|---|---|---|
| 0x9E8B01 | LAN | LOCAL AREA NETWORK |
| 0x9E8B02 | DUP | DIAL-UP NETWORK |
| 0x9E8B03 | LAN, DUP | LOCAL AREA NETWORK DIAL-UP NETWORK |
| 0x9E8B04 | HSP | HEADSET |
| ⋮ | ⋮ | ⋮ |

FIG. 26A

| ORDER OF PRIORITY | ITEM TYPE |
|---|---|
| 1 | RECEPTION STATE |
| 2 | COMMUNICATION COST |
| 3 | REMAINING BATTERY POWER |
| 4 | COMMUNICATION SPEED |
| 5 | TERMINAL TYPE |
| ⋮ | ⋮ |

FIG. 26B

| ORDER OF PRIORITY | TERMINAL TYPE |
|---|---|
| 1 | PC (IP TELEPHONE) |
| 2 | STATIONARY TELEPHONE |
| 3 | PHS |
| 4 | CELLULAR PHONE |
| ⋮ | ⋮ |

FIG. 27

| ITEM TYPE | CELLULAR PHONE 1a | CELLULAR PHONE 1b |
|---|---|---|
| RECEPTION STATE | STRONG | STRONG |
| COMMUNICATION COST | ¥20/MIN. | ¥10/MIN. |
| REMAINING BATTERY POWER | FULL | LITTLE |
| COMMUNICATION SPEED | 64kbps | 32kbps |
| TERMINAL TYPE | CELLULAR PHONE | CELLULAR PHONE |
| ⋮ | ⋮ | ⋮ |

WIRELESS COMMUNICATION SYSTEM

TECHNICAL FIELD

The present invention relates to a wireless communication system, and more particularly to a wireless communication system in which a source wireless communication device can receive one of a plurality of categories of services from one or more destination wireless communication devices via a wireless communication link.

BACKGROUND ART

In recent years, mobile communication devices such as cellular phones have seen a rapid prevalence. There has also been a rapid progress in short-range wireless technology. Against such backgrounds, short-range wireless data communications between at least two mobile communications devices, or between at least one mobile communication device and at least one peripheral device, are becoming more and more popular. An example of short-range wireless technology is Bluetooth (trademark). Bluetooth technology is essentially a short-range wireless data communication technique using low-directivity radiowaves, which enables an ad-hoc wireless connection (via radiowaves) between wireless communication devices within a region with a radius of about 10 m. Since Bluetooth tachnology allows modules to be designed in small sizes and with a small power consumption, Bluetooth technology is finding practical applications in, among others, mobile communication devices, e.g., cellular phones, PDAs (Personal Digital Assistants), wireless headsets, and peripheral devices thereof.

FIG. 28A, FIG. 28B, and FIG. 28C are schematic diagrams illustrating an initial stage, an intermediate stage, and a final stage of a wireless connection occurring between Bluetooth-compliant wireless communication devices. FIG. 28A to FIG. 28C illustrate three wireless communication devices, i.e., a cellular phone 100a, a cellular phone 100b, and a wireless headset 200, each incorporating a Bluetooth interface.

The cellular phones 100a and 100b will now be briefly described. FIG. 29 is a block diagram illustrating the structure of each of the cellular phones 100a and 100b shown in FIG. 28A to FIG. 28C. As shown in FIG. 29, each of the cellular phones 100a and 100b comprises a first antenna 101, a wireless communication section 102, and a response control section 103, as means for enabling short-range wireless data communications. The wireless communication section 102 includes an inquiry reception section 104 and a response transmission section 105. Furthermore, each of the cellular phones 100a and 100b comprises a second antenna 106 and a mobile communication section 107, as means for enabling voice calls.

The wireless headset 200 is structured so as to be capable of short-range wireless data communications. Preferably, the wireless headset 200 is structured so as to be capable of dialing a telephone number to which the cellular phone 100a or 100b should place a call.

FIG. 30 is a sequence chart illustrating the specific process performed by the cellular phone 100a or 100b shown in FIG. 28A to FIG. 28C.

By using FIG. 30, an example will be illustrated where the wireless headset 200 establishes a wireless connection in a Bluetooth-compliant manner. As shown in FIG. 28A and FIG. 30, in the initial stage, a wireless communication section (not shown) of the wireless headset 200 sends out an inquiry to the surrounding cellular phones 100a and 100b for establishing a Bluetooth link.

As shown in FIG. 28B and FIG. 30, in the intermediate stage, each of the cellular phones 100a and 100b sends out to the wireless headset 200 an inquiry response containing a Bluetooth device address (hereinafter referred to as "BD address") with which to identify itself. At this time, each of the cellular phones 100a and 100b performs the following process. As shown in FIG. 29, in each of the cellular phones 100a and 100b, the inquiry reception section 104 receives via the first antenna 101 the inquiry which has been sent from the wireless headset 200. The inquiry reception section 104 notifies to the response control section 103 that an inquiry has been received. In response to this notification, the response control section 103 generates the aforementioned inquiry response, and instructs the response transmission section 105 to transmit the generated inquiry response. Via the first antenna 101, the response transmission section 105 sends out the inquiry response as instructed by the response control section 103.

As shown in FIG. 28C and FIG. 30, in the final stage, if the wireless headset 200 receives a plurality of inquiry responses, the wireless headset 200 selects, in accordance with the user's operation, one of the cellular phones 100a and 100b from which the inquiry responses have been received. Then, the wireless headset 200 establishes a Bluetooth link, i.e., a wireless connection, with the selected cellular phone 100a or 100b.

Let us assume that the wireless headset 200 first selects the cellular phone 100b as a destination of connection, and establishes a Bluetooth link therewith. After the link establishment, as shown in FIG. 30, the user dials a number on the wireless headset 200 in order to place a voice call by means of the cellular phone 100b. However, upon finding out that the cellular phone 100b is outside of the range for placing or receiving calls (hereinafter referred as "call range"), i.e., the wireless headset 200 is unable to receive the desired "service" from the current destination, the wireless headset 200 is obliged to select, again in accordance with the user's operation, the other cellular phone 100a from which an inquiry response has been received, and establish a Bluetooth link therewith. Thereafter, in the cellular phone 100a, the mobile communication section 107 exchanges via the second antenna 106 voice data which is necessary for providing a voice call (i.e., the "service") to the user.

Thus, as more and more wireless communication devices having such a short-range wireless data communication function are present around a user, there emerges a problem in that the user attempting to obtain a wireless connection between wireless communication devices will be required to perform the cumbersome task of selecting a destination, thus finding it difficult to establish a connection between such wireless communication devices. A method for facilitating the designation of a destination in a wireless communication system has been proposed (e.g., US 2002/0045454 A1) in which a BD address is transmitted from a user's desired destination wireless communication device via infrared communications, so that the source wireless communication device can establish a Bluetooth link based on the received device ID.

However, the conventional wireless connection method has a problem in that the user still needs to select a BD address by operating the wireless communication device, or even if a wireless connection has been established, the destination wireless communication device may not be able to provide the desired service, thus wasting a connection process (because the source wireless communication device is not able to receive the desired service). While the connection method disclosed in the above-identified publication ensures that a desired pair of wireless communication devices are connected, it does not guarantee that a wireless communication device which is able to provide a service will always be connected to the source wireless communication device.

Therefore, an object of the present invention is to provide a wireless communication system which ensures that a source wireless communication device will be connected to a wireless communication device which is able to provide a service, while reducing the operational burden on the user.

SUMMARY OF THE INVENTION

To achieve the above object, the present invention has the following aspects. A first aspect of the present invention is directed to a wireless communication system comprising a first wireless communication device and at least one second wireless communication device, such that the first wireless communication device is capable of receiving a service selected from among a plurality of categories of services provided by the at least one second wireless communication device via a wireless communication link. The first wireless communication device includes a first wireless communication section operable to send out an inquiry which is necessary for establishing the wireless communication link. The at least one second wireless communication device includes: at least one service provision section operable to provide a service; a second wireless communication section operable to receive the inquiry sent from the first wireless communication section; and a determination section operable to determine, in response to the inquiry received by the second wireless communication section, whether the at least one service provision section is currently able to provide a service, based on a current service provision environment concerning the service provision section. The second wireless communication section is operable to send out an inquiry response to the presently received inquiry if the determination section determines that the at least one second wireless communication device is currently able to provide the service. The first wireless communication section is operable to receive the inquiry response sent from the second wireless communication section. The first wireless communication device further includes a destination selection section operable to select one of the at least one second wireless communication device to become a destination of the wireless communication link, in response to the inquiry response received by the first wireless communication section. The first wireless communication section is operable to send out a connection request for establishing the wireless communication link to the second wireless communication device selected by the destination selection section.

In one example, after establishing the wireless communication link, the selected second wireless communication device sends out data acquired from a remote device to the first wireless communication device.

A second aspect of the present invention is directed to a wireless communication device, as a destination wireless communication device to which a wireless communication link from a source wireless communication device is to be established, capable of providing a service selected from among at least one category of services for a source wireless communication device via a wireless communication link. The wireless communication device of the second aspect comprises: at least one service provision section operable to provide a service; a wireless communication section operable to receive an inquiry sent from the source wireless communication device; and a first determination section operable to determine, in response to the inquiry received by the wireless communication section, whether the at least one service provision section is currently able to provide a service, based on a current service provision environment concerning the at least one service provision section. The wireless communication section is operable to send out an inquiry response to the presently received inquiry if the first determination section determines that the at least one service provision section is currently able to provide the service.

Preferably, the inquiry response sent out by the wireless communication section contains currently-providable service information representing a currently providable service.

Preferably, the wireless communication section receives an inquiry containing requested service information representing a service that is requested by the source wireless communication device. The wireless communication device further comprises a second determination section operable to determine whether the service requested in the inquiry received by the wireless communication section matches the service provided by the service provision section. Moreover, the wireless communication section is operable to send out the inquiry response to the presently received inquiry if the second determination section determines that the service requested in the inquiry received by the wireless communication section matches the service provided by the service provision section and if the first determination section determines that the at least one service provision section is currently able to provide the service.

Preferably, the inquiry received by the wireless communication section contains supported service information representing a service that is supported by the source wireless communication device. The wireless communication device further comprises a second determination section operable to determine whether the service provision section is currently able to provide the service designated in the inquiry received by the wireless communication section. Moreover, the wireless communication section sends out the inquiry response to the presently received inquiry if the second determination section determines that the service provision section is currently able to provide the designated service requested and if the first determination section determines that the at least one service provision section is currently able to provide the service.

Preferably, the inquiry response sent out by the wireless communication section contains information concerning a service provision environment. In the case where, after establishing the wireless communication link, the destination wireless communication device sends data acquired from a remote device to the source wireless communication device, the service provision environment at least includes an environment for a communication between the destination wireless communication device and the remote device. More specifically, the service environment information at least comprises one selected from the group including: a type of the destination wireless communication device, a reception state of radiowaves at the destination wireless communication device, a communication speed and communication cost of the destination wireless communication device, and remaining battery power of a battery and processing power of a processor incorporated in the destination wireless communication device.

A third aspect of the present invention is directed to a wireless communication device which, as a source wireless communication device from which to establish a wireless communication link to at least one prospective destination wireless communication device, is capable of receiving a service selected from among a plurality of categories of services provided by the at least one prospective destination wireless communication device via the wireless communication link. The wireless communication device comprises: a wireless communication section operable to send out an inquiry which is necessary for establishing the wireless communication link. The at least one prospective destination wireless communication device is operable to: provide at least one service; in response to receipt of the inquiry, determine whether the at least one prospective destination wireless communication device is currently able to provide a service, based on a current service provision environment concerning the at least one prospective destination wireless communication device, and send out an inquiry response to the presently received inquiry if it is determined that the at least one prospective destination wireless communication device is currently able to provide the service. The wireless communication section is operable to receive the inquiry response sent from the at least one prospective destination wireless communication device. The wireless communication device further includes a destination selection section operable to select one of the at least one prospective destination wireless communication device, in response to the inquiry response received by the wireless communication section.

In one example, the inquiry response sent out by the at least one prospective destination wireless communication device contains information concerning a service provision environment. The wireless communication device further comprises a priority storage section operable to store priority information indicating at least one service provision environment and a priority level assigned to each service provision environment. Furthermore, the destination selection section is operable to select one of the at least one prospective destination wireless communication device based on the priority information stored in the priority storage section.

Preferably, the wireless communication device further comprises a priority input section operable to accept inputting of priority information to be stored in the priority storage section.

A fourth aspect of the present invention is directed to a method of establishing a wireless communication link in a wireless communication system in which a first wireless communication device is capable of receiving a service selected from among a plurality of categories of services provided by at least one second wireless communication device via the wireless communication link. The method comprises: a step performed by each of the at least one second wireless communication device of determining, in response to the receipt of an inquiry received from the first wireless communication device, whether the second wireless communication device is currently able to provide a service, based on a current service provision environment concerning the second wireless communication device; a step performed by the second wireless communication device of sending out an inquiry response to the presently received inquiry if it is determined that the second wireless communication device is currently able to provide the service; a step performed by the first wireless communication device of selecting one of the at least one second wireless communication device to become a destination of the wireless communication link, in response to the inquiry response received from the second wireless communication device; and a step performed by the first wireless communication device of sending out a connection request for establishing the wireless communication link to the second wireless communication device selected by the first wireless communication device.

According to the first to fourth aspects of the present invention as described above, prior to the establishment of a wireless communication link between a plurality of wireless communication devices, in response to an inquiry from a first wireless communication device (source wireless communication device), it is determined whether the provision of a service is currently possible based on a current service provision environment concerning the service provision section, so that only the second wireless communication device (prospective destination wireless communication device) that is currently able to provide a service will send out an inquiry response. The first wireless communication device (source wireless communication device) selects a destination from among the second wireless communication device(s) (prospective destination wireless communication device(s)) which have sent out an inquiry response, and establishes a wireless communication link with the selected destination wireless communication device. As a result, the first wireless communication device (source wireless communication device) is prevented from establishing a wireless communication link with a second wireless communication device which is currently unable to provide a service. Thus, it is possible to prevent wireless communication links from being established in vain. Furthermore, since the first wireless communication device (source wireless communication device) is capable of selecting a destination, the user's operational burden associated with having to designate a device address of a second wireless communication device can be reduced.

By including currrently-providable service information in the inquiry response, it becomes possible for the source wireless communication device to select, by itself, from among the prospective destination wireless communication device(s) which have sent out an inquiry response, a destination which is suitable for the source wireless communication device.

By including requested service information or supported service information in the inquiry, it becomes possible for the source wireless communication device to designate a service. As a result, it becomes possible for the source wireless communication device to select, by itself, a destination which is suitable for the source wireless communication device.

By including information concerning a service provision environment in the inquiry response, it becomes possible for the source wireless communication device to know the environment concerning the service which the prospective destination is able to provide. As a result, it becomes possible for the source wireless communication device to select, by itself, a destination which is suitable for the source wireless communication device.

By incorporating a priority storage section in the source wireless communication device, it becomes possible for the source wireless communication device to select, by itself, from among the prospective destination wireless communication devices, a destination which is most satisfactory to the source wireless communication device.

By incorporating a priority input section in the source wireless communication device, it becomes possible for the user to change the priority information according to his or her preference.

These and other objects, features, aspects and advantages of the present invention will become more apparent from the following detailed description of the present invention when taken in conjunction with the accompanying drawings.

BRIEF DESCRIPTION OF THE DRAWINGS

FIG. 16A is a first schematic diagram illustrating the frame format of an FHS packet which can be transmitted as an inquiry response by the cellular phones 1a and 1b shown in FIG. 11;

FIG. 16B is a schematic diagram exemplifying a number of IDs which are set in the "Profile" field shown in FIG. 16A;

FIG. 16C is a second schematic diagram illustrating the frame format of an FHS packet which can be transmitted as an inquiry response by the cellular phones 1a and 1b shown in FIG. 11;

FIG. 22 is a sequence chart illustrating an establishment of a wireless communication link between each of the cellular phones 1a and 1b and the wireless headset 2 according to the third embodiment;

FIG. 26A is a schematic diagram illustrating a first example of priority information which is inputted by a priority input section 72 and stored in a priority storage section 73 shown in FIG. 24;

FIG. 26B is a schematic diagram illustrating a second example of priority information which is inputted by a priority input section 72 and stored in a priority storage section 73 shown in FIG. 24;

FIG. 27 is a schematic diagram illustrating a table of service information contained in an inquiry sent from a wireless communication device serving as a prospective destination for the wireless headset 2 shown in FIG. 24;

DETAILED DESCRIPTION OF THE INVENTION

First Embodiment

Figure 1A:
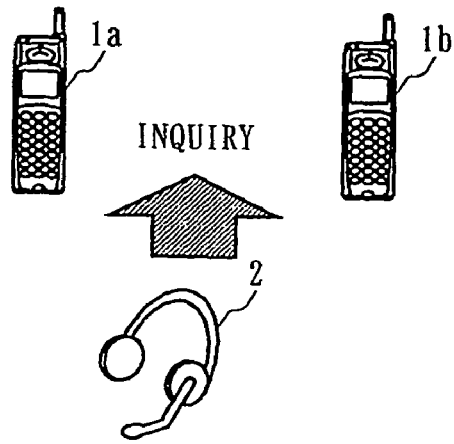
FIG. 1A is a schematic diagram illustrating an initial stage of a wireless connection established in a wireless communication system according to a first embodiment of the present invention.
Figure 1B:
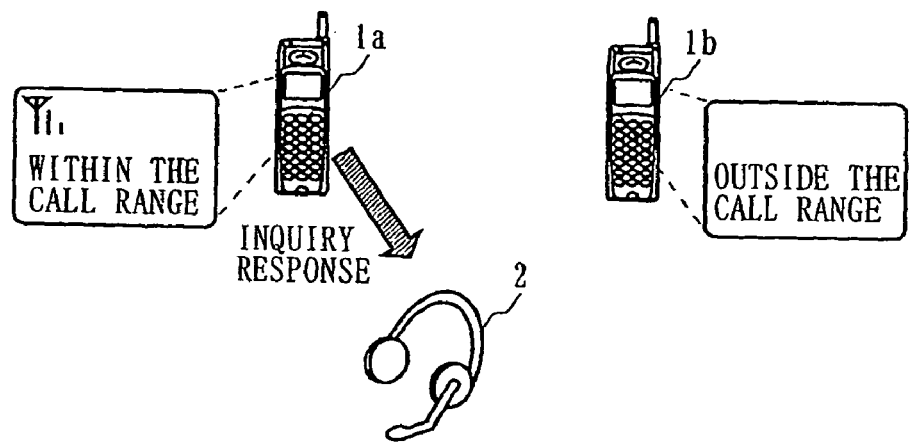
FIG. 1B is a schematic diagram illustrating an intermediate stage of a wireless connection established in the wireless communication system shown in FIG. 1A.
Figure 1C:
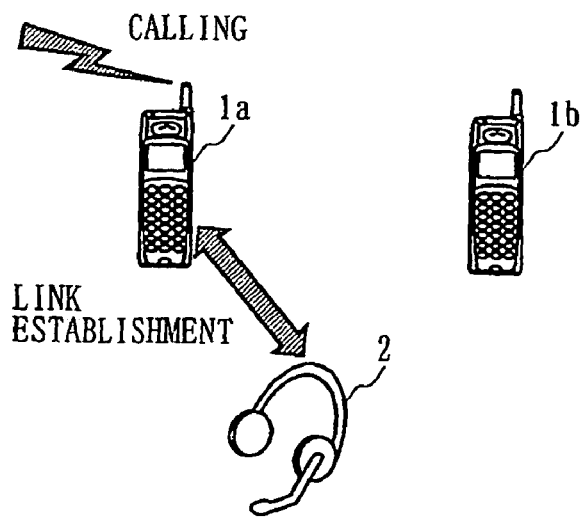
FIG. 1C is a schematic diagram illustrating a final stage of a wireless connection established in the wireless communication system shown in FIG. 1A.
Figure 2A:
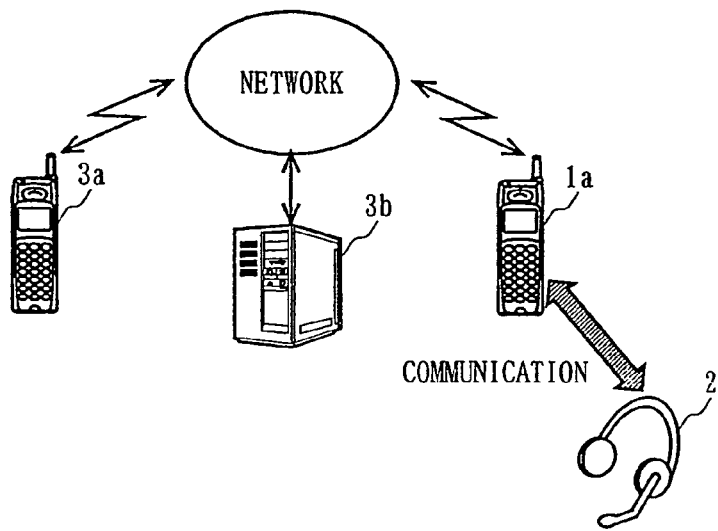
FIG. 2A is a schematic diagram illustrating an example of a communication which is performed after the establishment of a wireless connection in the wireless communication system shown in FIG. 1A to FIG. 1C.

FIGS. 1A, 1B, and 1C are schematic diagrams illustrating an initial stage, an intermediate stage, and a final stage, respectively, of a wireless connection that is established in a wireless communication system according to a first embodiment of the present invention. FIG. 2A is a schematic diagram illustrating an example of a communication which is performed after the establishment of a wireless connection in the present wireless communication system.

In FIG. 1A to FIG. 1C, the wireless communication system accommodates a plurality of (e.g., three) wireless communication devices. Specifically, FIG. 1A to FIG. 1C illustrate a cellular phone 1a, a cellular phone 1b, and a wireless headset 2 as three wireless communication devices which are compliant with a short-range wireless communication protocol such as Bluetooth. Each of these wireless communication devices is able to receive a service which is selected from among a plurality of categories of services which are providable from one or more destination wireless communication devices, via a wireless communication link which is established in an ad-hoc manner in accordance with the above protocol. A typical example of such a service would be the provision or exchange of voice data, video data, audio data, or text data. In the case of the present embodiment, which involves the cellular phone 1a, cellular phone 1b, and the wireless headset 2 as mentioned above, the cellular phone 1a or 1b mainly provides the service of voice data exchange for the wireless headset 2. FIG. 2A additionally shows a cellular phone 3a which is at the other end of the voice communication performed by the cellular phone 1a or 1b, and a server 3b which is at the other end of the data communication performed by the cellular phone 1a or 1b. In other words, voice data originating from the cellular phone 3a is sent to the wireless headset 2, and the user's voice data is eventually sent to the cellular phone 3a. Thus, any two wireless communication devices accommodated in the present system do not perform a one-to-one wireless communication in the strict sense of the word. Rather, it is often the case that the wireless communication between any two wireless communication devices accommodated in the present system involves a "third" device, such as the cellular phone 3a or the server 3b (see FIG. 2A). Depending on the state of such a "third" device, the destination wireless communication device in the present system may not be able to provide a service to the source wireless communication device. Such characteristics should be kept in mind in understanding the working principle of the present wireless communication system.

Next, with reference to FIG. 1A to FIG. 1C, a wireless connection that is established by the wireless headset 2 will be illustrated as an example of a wireless connection in the present system. As shown in FIG. 1A, in the initial stage, the wireless headset 2 sends out an inquiry for establishing a Bluetooth wireless communication link to the cellular phones 1a and 1b which are present around itself.

As shown in FIG. 1B, in the intermediate stage, in response to the receipt of an inquiry, each of the cellular phones 1a and 1b determines whether it is able to provide a service to the wireless headset 2, by investigating the "service provision environment", which is herein defined as the elements which are indispensable to the provision of a desired service, e.g., the communication environment and/or device resource(s). In the case of the present embodiment, where voice data from a telephone call service is to be exchanged, each cellular phone 1a or 1b determines, as an example of a service provision environment investigation, whether it is located in a call range for placing or receiving voice calls. For the sake of illustration, let us assume that only the cellular phone 1a is located within the call range, whereas the cellular phone 1b is outside the call range. Under this assumption, the cellular phone 1a determines by itself that the cellular phone 1a is currently able to provide a service, and sends out an inquiry response containing a BD address (Bluetooth device address) for identifying itself to the wireless headset 2. On the other hand, the cellular phone 1b determines by itself that the cellular phone 1b is not currently able to provide a service, so that the cellular phone 1b does not send out an inquiry response, thus being not involved in the current wireless connection.

Furthermore, in the final stage as shown in FIG. 1C, the wireless headset 2 establishes a wireless communication link with the cellular phone 1a in response to the received inquiry response, by using the BD address contained therein.

After the establishment of the wireless communication link, as show in FIG. 2A, the wireless headset 2 performs a data communication with the cellular phone 1a by a Bluetooth-defined method. Thus, the wireless headset 2 receives the voice sent from the remote cellular phone 3a, and sends the user's voice to the cellular phone 3a. In another situation, the wireless headset 2 may receive various data which is sent from the remote server 3b by communicating with the cellular phone 1a through the established wireless communication link.

By establishing a wireless communication link in the above-described procedure, the wireless headset 2 (as one example of a source wireless communication device) can avoid making a wireless connection with the cellular phone 1b (as one example of a wireless communication device currently unable to provide a service). Instead, the wireless headset 2 can establish a Bluetooth link with the cellular phone 1a (as one example of a wireless communication device currently able to provide a service).

Figure 2B:
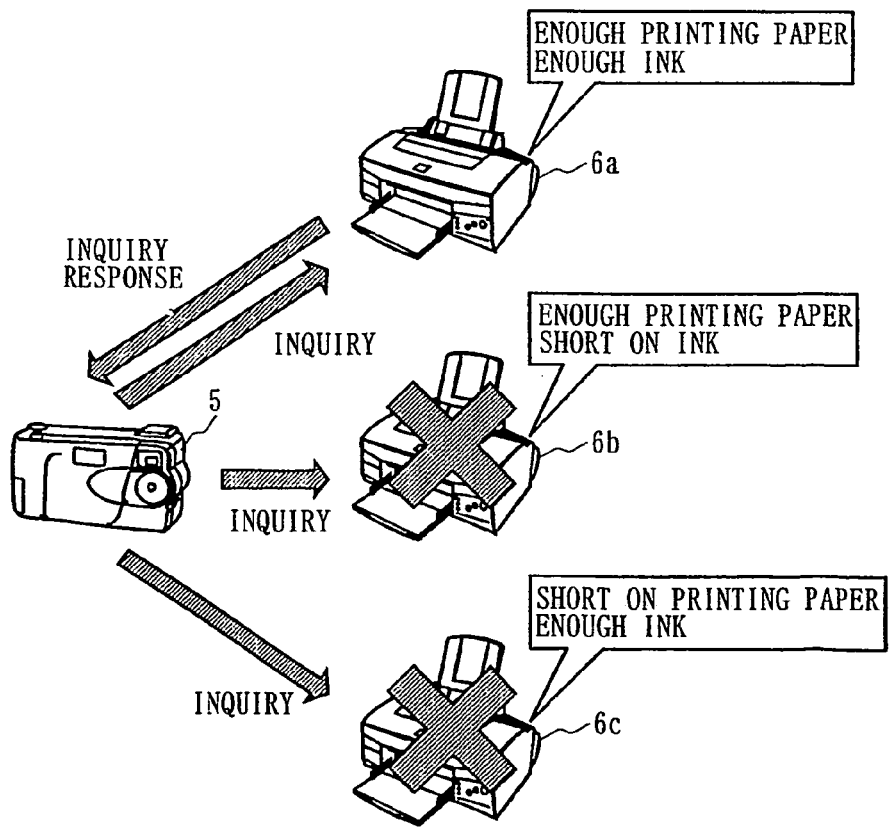
FIG. 2B is a schematic diagram illustrating an example of a communication which is performed in accordance with another exemplary structure of the wireless communication system of the first embodiment.

Although the present embodiment illustrates a wireless connection between the wireless headset 2 and the cellular phone 1a, another example might be where, as shown in FIG. 2B, image information is transmitted from a digital still camera 5 to one of printers 6a, 6b, and 6c via wireless communications so as to be printed thereby. In this case, each printer investigates the service provision environment, which in this case is how much print paper or ink is left. Note that in this example there is no direct involvement of a "third" device in the aforementioned sense. In this example, the service provision environment of the printers 6a to 6C, as the plurality of destination wireless communication devices, is the resource which each printer currently has, i.e., the current amount of print paper and current ink amount.

Figure 3:
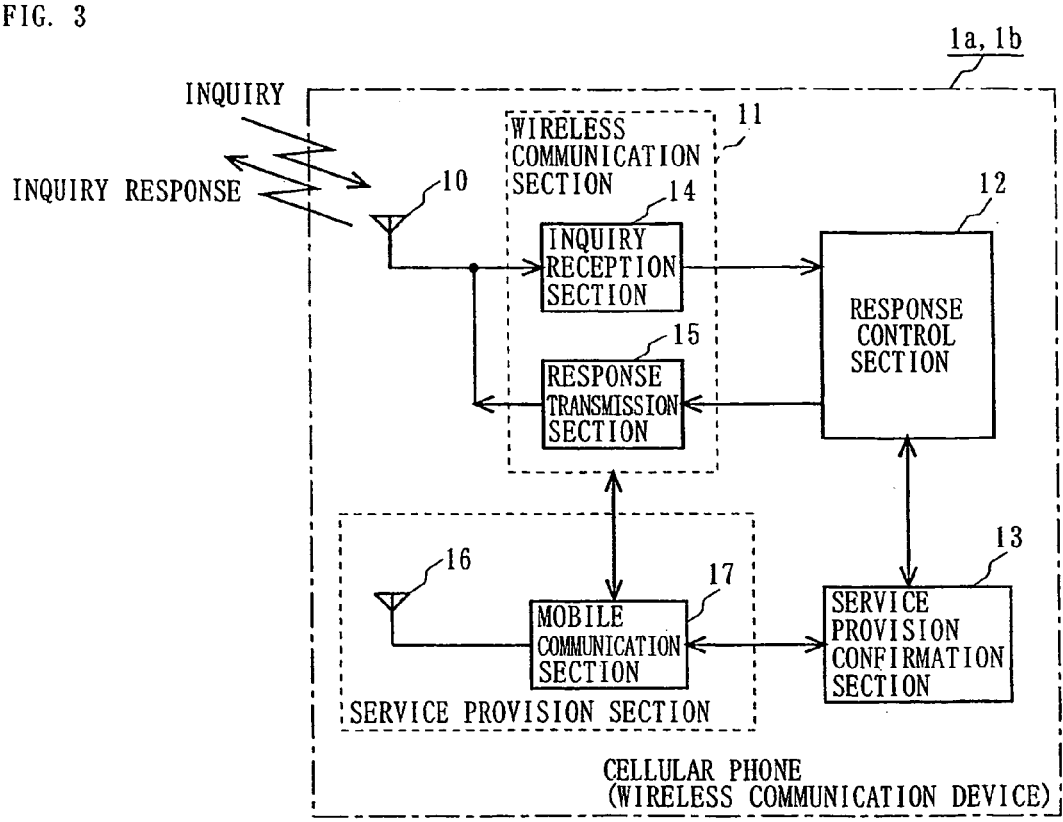
FIG. 3 is a block diagram illustrating the internal structure of cellular phones 1a and 1b shown in FIG. 1A to FIG. 1C.

FIG. 3 is a block diagram illustrating the internal structure of the cellular phones 1a and 1b shown in FIG. 1A to FIG. 1C. Since it is assumed that the cellular phones 1a and 1b have the same internal structure, the internal structure of the cellular phone 1a will be referred to in the following description. In FIG. 3, the cellular phone 1a comprises a first antenna 10, a wireless communication section 11, a response control section 12, and a service provision confirmation section 13, as means for enabling short-range wireless data communications. The wireless communication section 11 includes an inquiry reception section 14 and a response transmission section 15. Furthermore, the cellular phone 1a comprises a second antenna 16 and a mobile communication section 17, which constitute a service provision section for providing a voice call service.

Figure 4:
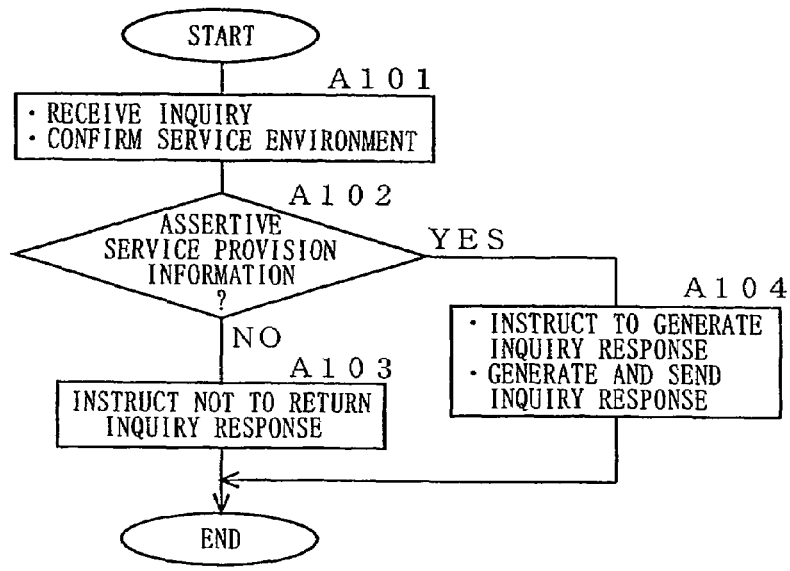
FIG. 4 is a flowchart illustrating an operation which is performed when a wireless communication link is established by the cellular phones 1a and 1b shown in FIG. 1A to FIG. 1C.

FIG. 4 is a flowchart illustrating an operation which is performed when a wireless communication link is established by the cellular phones 1a and 1b shown in FIG. 1A to FIG. 1C.

Hereinafter, with reference to FIG. 3 and FIG. 4, the operation which is performed by the cellular phone 1a after receiving an inquiry will be described. Since the cellular phones 1a and 1b perform identical operations, the description of the operation of the cellular phone 1b will be omitted.

Via the first antenna 10, the inquiry reception section 14 receives an inquiry which has been sent from the wireless headset 2 (as a source wireless communication device). Then, the inquiry reception section 14 notifies the receipt of an inquiry to the response control section 12. In response to the notification from the inquiry reception section 14, the response control section 12 asks the service provision confirmation section 13 as to whether the mobile communication section 17 is currently able to handle voice calls, i.e., whether the cellular phone 1a is currently able to provide a service.

The service provision confirmation section 13 investigates the service provision environment to determine whether the mobile communication section 17 is currently able to provide a service. In the present embodiment, the service provision confirmation section 13 first acquires the reception state of the second antenna 16 from the mobile communication section 17, and determines whether the cellular phone 1a is currently located within the call range or outside the call range. If it is determined that the cellular phone 1a is currently located within the call range, the service provision confirmation section 13 passes assertive service provision information, which indicates that cellular phone 1a is currently able to provide a voice call service, to the response control section 12 (FIG. 4; step A101). If otherwise determined, the service provision confirmation section 13 passes negative service provision information, which indicates that the cellular phone 1a is currently unable to provide a service, to the response control section 12 (FIG. 4; step A101).

In response to the service provision information from the service provision confirmation section 13, the response control section 12 determines whether assertive service provision information has been received or negative service provision information has been received (step A102). If negative service provision information has been received, the response control section 12 instructs the response transmission section 15 not to return an inquiry response (step A103), thus ending the processing illustrated in FIG. 4. On the other hand, if assertive service provision information has been received, the response control section 12 instructs the response transmission section 15 to generate and send an inquiry response. In response to the instruction from the response control section 12, the response transmission section 15 generates an inquiry response containing a BD address which is assigned to the cellular phone 1a, and sends out the generated inquiry response via the first antenna 10 (step A104).

Figure 5:
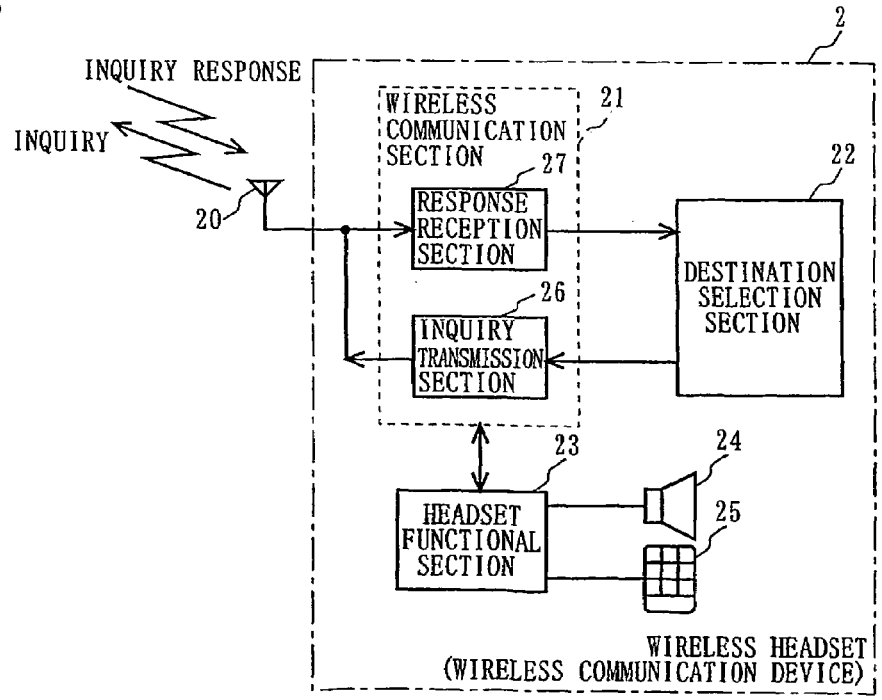
FIG. 5 is a block diagram illustrating the internal structure of a wireless headset 2 shown in FIG. 1A to FIG. 1C.

FIG. 5 is a block diagram illustrating the internal structure of the wireless headset 2 shown in FIG. 1A to FIG. 1C. In FIG. 5, the wireless headset 2 comprises an antenna 20, a wireless communication section 21, a destination selection section 22, a headset functional section 23, a loudspeaker section 24, and a microphone section 25, as means for enabling short-range wireless data communications. The wireless communication section 21 includes an inquiry transmission section 26 and a response reception section 27.

Figure 6:
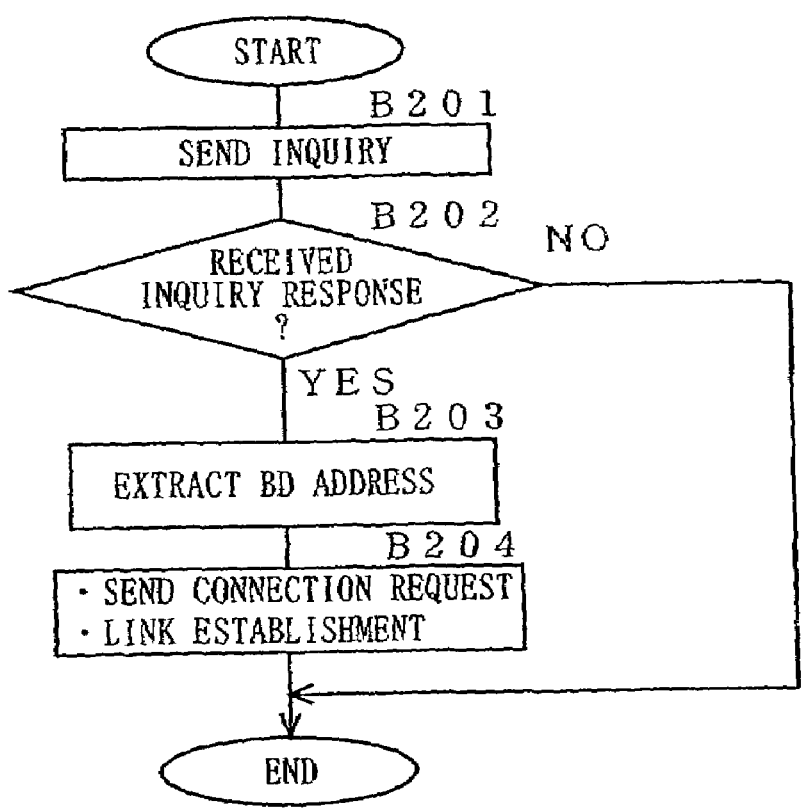
FIG. 6 is a flowchart illustrating an operation which is performed when a wireless communication link is established by the wireless headset 2 shown in FIG. 1A to FIG. 1C.

FIG. 6 is a flowchart illustrating an operation which is performed when a wireless communication link is established by the wireless headset 2 shown in FIG. 1A to FIG. 1C.

Hereinafter, referring to FIGS. 5 and 6, the operation of the wireless headset 2 will be described.

When initiating a communication from the wireless headset 2 to the cellular phone 1a or 1b, a wireless communication link must be established. To this end, the inquiry transmission section 26 sends an inquiry via the antenna. 20 (FIG. 6; step B201). Thereafter, the response reception section 27 awaits an inquiry response to be sent from an external device. Upon receiving an inquiry response via the antenna 20, the response reception section 27 passes the received inquiry response to the destination selection section 22. If the response reception section 27 receives inquiry responses from a plurality of wireless communication devices, the response reception section 27 performs the above operation each time such an inquiry response is received.

If no inquiry response is received from the response reception section 27 during a predetermined period of waiting for an inquiry response (step B202), the destination selection section 22 does not perform steps B203 and B204, thus ending the processing illustrated in FIG. 6. On the other hand, if one or more inquiry responses have been received, the destination selection section 22 selects one of the prospective destination wireless communication device(s) by selecting one of the received inquiry responses, and extracts the BD address from the selected inquiry response (step B203).

Thereafter, the destination selection section 22 passes the extracted BD address to the wireless communication section 21, and instructs the wireless communication section 21 to establish a wireless communication link with the destination wireless communication device identified by the BD address. In response to this instruction, the wireless communication section 21 sends out a connection request containing the BD address as received from the destination selection section 22, via the antenna 20. Thereafter, the wireless headset 2 performs processes which are necessary for establishing a wireless communication link with the selected destination wireless communication device (i.e., the cellular phone 1a in the example illustrated in FIG. 1C) (step B204).

As described above, in accordance with the source wireless communication device of the present embodiment, a destination can be automatically selected. As a result, the operational burden associated with designating the destination device address is reduced.

Figure 7:
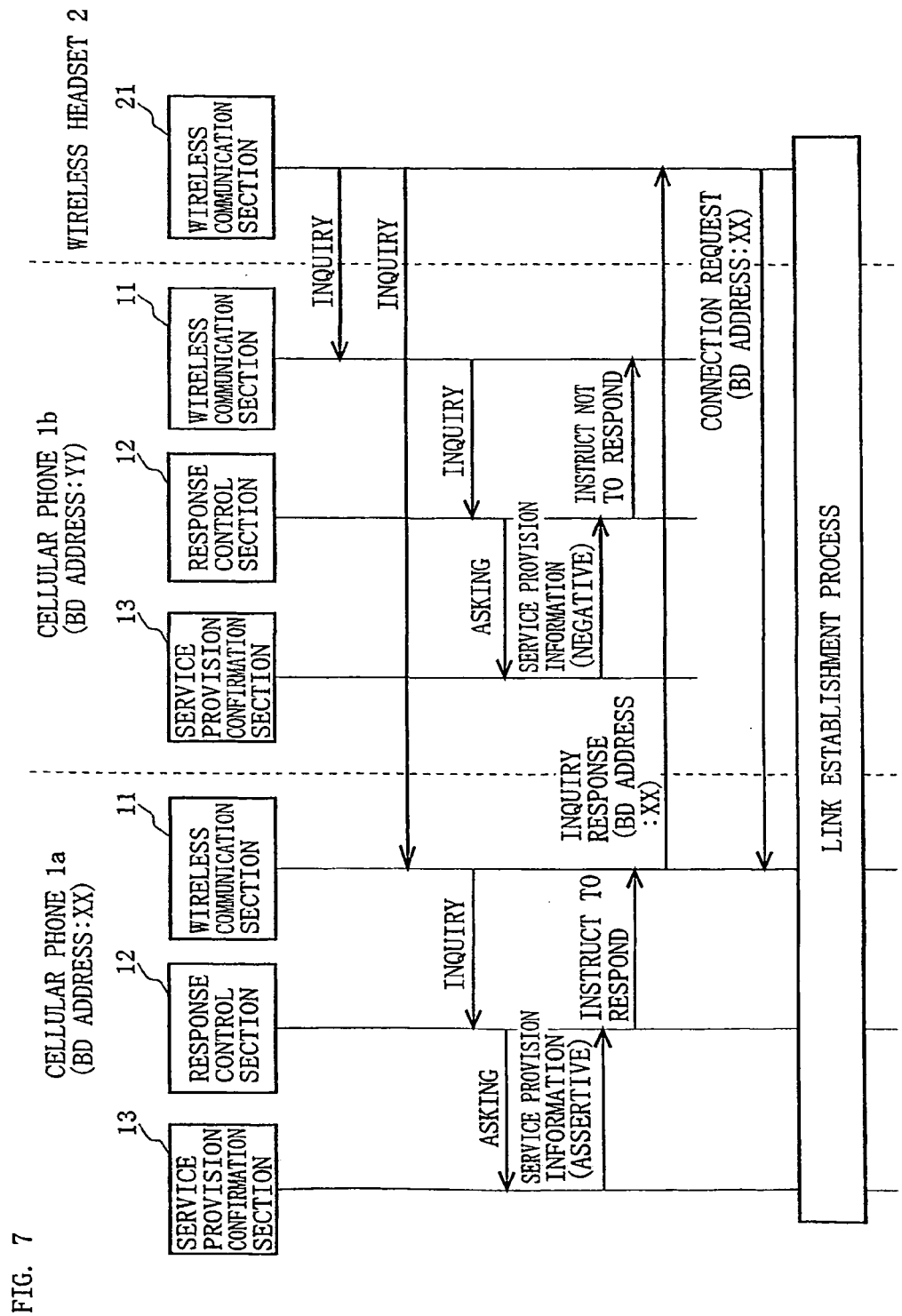
FIG. 7 is a sequence chart illustrating an establishment of a wireless communication link between each of the cellular phones 1a and 1b and the wireless headset 2 shown in FIG. 1A to FIG. 1C.

FIG. 7 is a sequence chart illustrating an establishment of a wireless communication link between each of the cellular phones 1a and 1b and the wireless headset 2 shown in FIG. 1A to FIG. 1C. In FIG. 7, the wireless communication section 21 of the wireless headset 2 first sends out an inquiry to outside of the wireless headset 2. Assuming that both cellular phones 1*a* and 1*b* are located within a range for successfully receiving an inquiry from the wireless headset 2, the wireless communication section 11 of each of the cellular phones 1*a* and 1*b* receives the inquiry which has been transmitted from the wireless headset 2. Thereafter, in each of the cellular phones 1*a* and 1*b*, the wireless communication section 11 passes the received inquiry to the response control section 12, as described above. Based on the service provision information from the service provision confirmation section 13, the response control section 12 instructs the response transmission section 15 whether or not to transmit an inquiry response, as described above.

Again assuming that only the cellular phone 1*a* is located within the call range, assertive service provision information is generated only in the cellular phone 1*a*. Therefore, an inquiry response containing the BD address "XX" of the cellular phone 1*a* is sent out from the wireless communication section 11. On the other hand, the cellular phone 11*b* is located outside the call range and thus unable to provide a telephone call service. Therefore, in the cellular phone 1*b*, the service provision confirmation section 13 generates negative service provision information. As a result, the response control section 12 in the cellular phone 1*b* instructs the wireless communication section 11 not to transmit an inquiry response.

At the wireless headset 2, the wireless communication section 21 only receives an inquiry response with the BD address "XX" in response to the inquiry which has been sent out from the wireless headset 2. Therefore, the wireless communication section 21 sends to the cellular phone 1*a* a connection request containing the BD address "XX", and then establishes a wireless communication link with the cellular phone 1*a*.

Figure 8A:
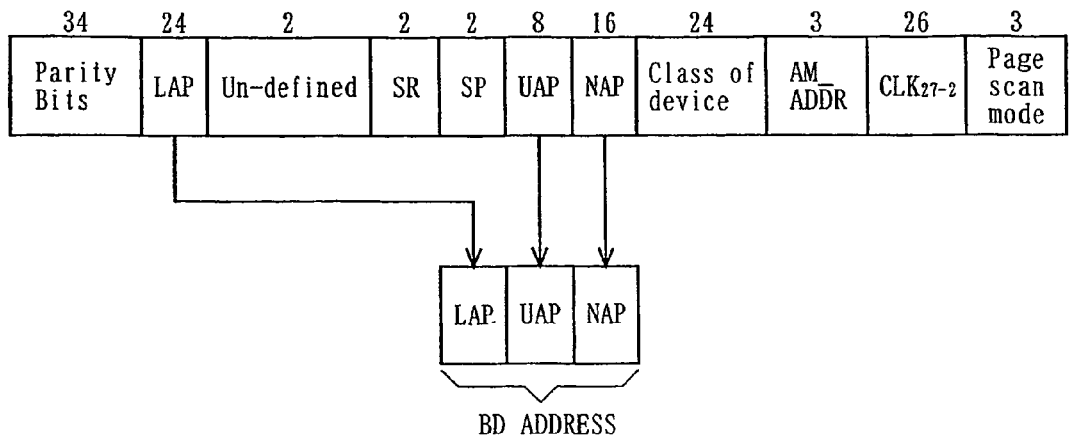
FIG. 8A is a first schematic diagram illustrating the frame format of an FHS (Frequency Hop Synchronization) packet which is transmitted as an inquiry response by the cellular phone 1a shown in FIG. 1A to FIG. 1C.
Figure 8B:
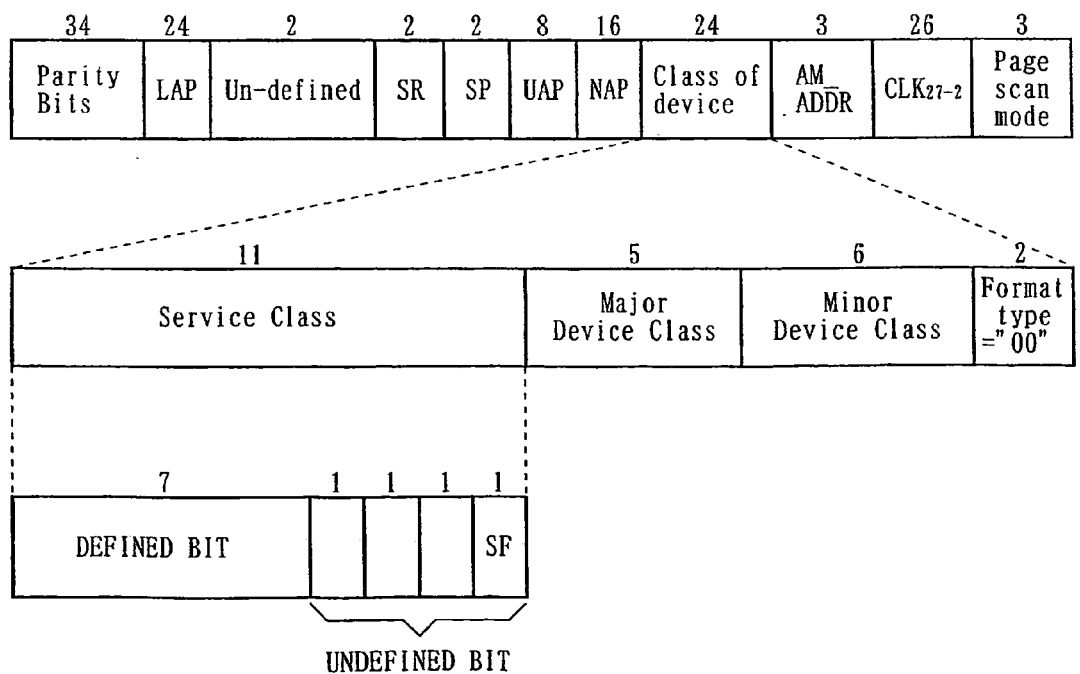
FIG. 8B is a second schematic diagram illustrating the frame format of an FHS packet which is transmitted as an inquiry response by the cellular phone 1a shown in FIG. 1A to FIG. 1C.

Preferably, the cellular phone 1*a* sets an SF (Service Flag) as described below in the inquiry response. FIGS. 8A and 8B are schematic diagrams illustrating the frame format of an FHS (Frequency Hop Synchronization) packet which is transmitted as an inquiry response by the cellular phone 1*a* shown in FIG. 1A to FIG. 1C. In FIG. 8A, the FHS packet contains LAP, UAP, and NAP fields. The LAP field represents a lower address of a unit by which an FHS packet is sent. The UAP field represents an upper address of the unit by which an FHS packet is sent. The NAP field represents a non-significant address of the unit by which an FHS packet is sent. The three fields LAP, UAP, and NAP together represent the BD address of the cellular phone 1*a*.

As shown in FIG. 8B, the FHS packet further contains a "Class of device" field. The "Class of device" field represents a device class that the unit by which an FHS packet is sent belongs to. Note that 24 bits are allocated for the "Class of device" field, out of which 11 bits are allocated for a "Service Class" field which represents a service class name. In the "Service Class" field, the first 7 bits are already defined. In the present embodiment, one of the undefined 4 bits of the "Service Class" field is allocated as the SF field. The SF is a flag for identifying an inquiry response which has been generated after confirming whether the device issuing the inquiry response is currently able to provide a service or not.

Setting an SF in the inquiry response provides the following advantage. If the wireless headset 2 according to the present embodiment sends out an inquiry in an environment which accommodates both the cellular phone 1*a* according to the present embodiment and generic cellular phones, it is possible to identify whether the received inquiry response is from a generic cellular phone or from the cellular phone 1*a* service, which is currently able to provide a service.

Figure 9:
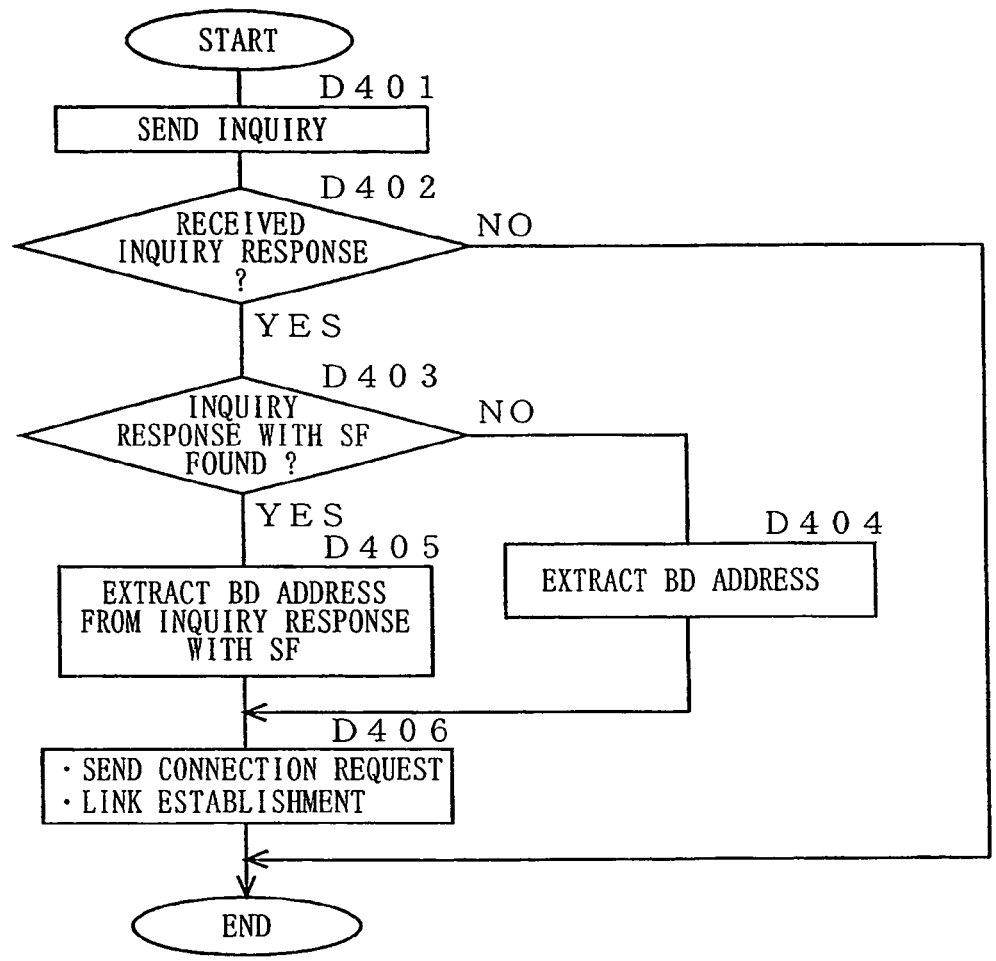
FIG. 9 is a flowchart illustrating an operation which is performed when the wireless headset 2 shown in FIG. 5 receives an inquiry response having an SF (Service Flag)

FIG. 9 is a flowchart illustrating an operation which is performed when the wireless headset 2 receives an inquiry response having an SF. In FIG. 9, the inquiry transmission section 26 sends out an inquiry, as in step B201 (step D401). Thereafter, the response reception section 27 passes the inquiry response having been received via the antenna 20 to the destination selection section 22. The destination selection section 22 determines whether one or more inquiry responses have been received, as in step B202 (step D402).

If no inquiry response has been received, the destination selection section 22 ends the processing illustrated in FIG. 9. On the other hand, if any inquiry response has been received, the destination selection section 22 determines whether an SF is set in any of the presently received inquiry responses (step D403).

If it is determined that none of the inquiry responses includes an SF set therein, the destination selection section 22 extracts one BD address, as in step B203 (step D404). On the other hand, if it is determined that an inquiry response(s) includes an SF set therein, the destination selection section 22 selects one of the inquiry responses that include an SF set therein, and extracts the BD address from the selected inquiry response (step D405).

After either step D404 or D405, the wireless headset 2 performs processes which are necessary to establish a wireless communication link with the destination wireless communication device which is specified by the selected BD address, as in step B204 (step D406).

Figure 10:
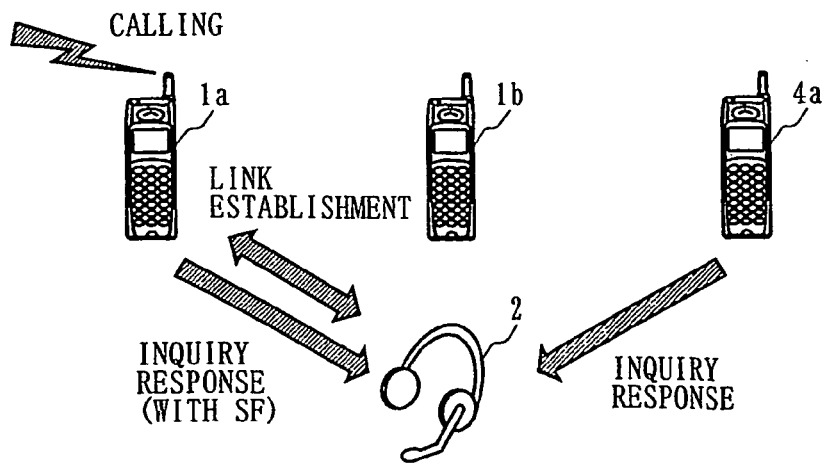
FIG. 10 is a schematic diagram illustrating an advantage of the inquiry response having an SF as shown in FIG. 8A and FIG. 8B.

FIG. 10 is a schematic diagram illustrating an advantage of the inquiry response having an SF therein as shown in FIG. 8A and FIG. 8B In FIG. 10, not only the cellular phones 1*a* and 1*b* according to the present embodiment but also a generic cellular phone 4*a* is present around the wireless headset 2. Since the cellular phone 1*a* is located within the call range, the cellular phone 1*a* returns an inquiry response having an SF to the inquiry from the wireless headset 2. Since the cellular phone 1*b* is located outside the call range, the cellular phone 1*b* does not return any inquiry response to the inquiry from the wireless headset 2. On the other hand, the cellular phone 4*a* does not have the function of determining whether it is able to provide a service as described in the present embodiment, so that the cellular phone 4*a* returns an inquiry without an SF to the inquiry from the wireless headset 2. In this case, the wireless headset 2 receives two inquiries, but the inquiry response having an SF is given priority through the processing illustrated in FIG. 9. Thus, the likelihood of establishing a Bluetooth link with the wireless communication device currently able to provide a service (i.e., the cellular phone 1*a* in this example) is enhanced.

On the other hand, if the generic wireless communication device receives an inquiry response from the cellular phone 1*a* according to the present embodiment, the generic wireless communication device will ignore the SF, which is set in an undefined field. Thus, there is no unfavorable effects due to the setting of the SF.

Second Embodiment

The first embodiment illustrated an example where each of the cellular phones 1*a* and 1*b* includes one service provision section (e.g., the mobile communication section 17). The present embodiment illustrates an example where each of the cellular phones 1*a* and 1*b* includes a plurality of service provision sections, as a variant of the first embodiment. Also, the present embodiment illustrates a case where currently-providable service information is included in the inquiry response, in addition to the BD address of the wireless communication device and the aforementioned SF.

In the present embodiment, the overall configuration of the wireless communication system is identical to that in the first embodiment (FIG. 1A to FIG. 1C). Therefore, any diagrammatic illustration of the wireless communication system according to the present embodiment will be omitted.

Figure 11:
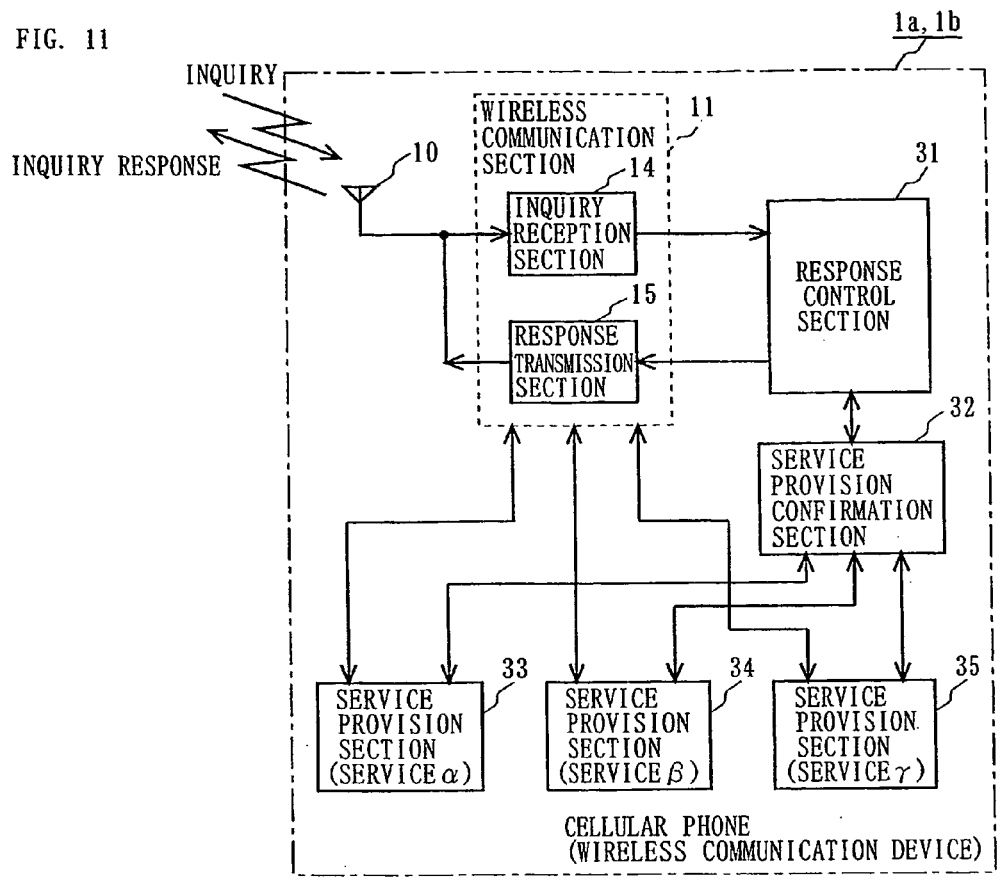
FIG. 11 is a block diagram illustrating the internal structure of cellular phones 1a and 1b as wireless communication devices according to a second embodiment of the present invention.

FIG. 11 is a block diagram illustrating the internal structure of the cellular phones 1a and 1b as wireless communication devices according to the second embodiment of the present invention. In the present embodiment, it is assumed that the cellular phones 1a and 1b have the same internal structure, and only the internal structure of the cellular phone 1a will be referred to in the following description. Referring to FIG. 11, the cellular phone 1a differs from that of the first embodiment in that the cellular phone 1a of the second embodiment comprises a response control section 31 and a service provision confirmation section 32 as means for enabling short-range wireless data communications, instead of a response control section 12 and a service provision confirmation section 13. Furthermore, the cellular phone 1a of the second embodiment comprises three service provision sections 33 to 35, which are examples of a plurality of discrete categories of service provision sections. Otherwise, the cellular phones 1a and 1b according to the present embodiment are identical in structure to those of the first embodiment. Therefore, in FIG. 11, those elements which have their counterparts in FIG. 3 will be denoted by like numerals, and the descriptions thereof will be omitted.

Figure 12:
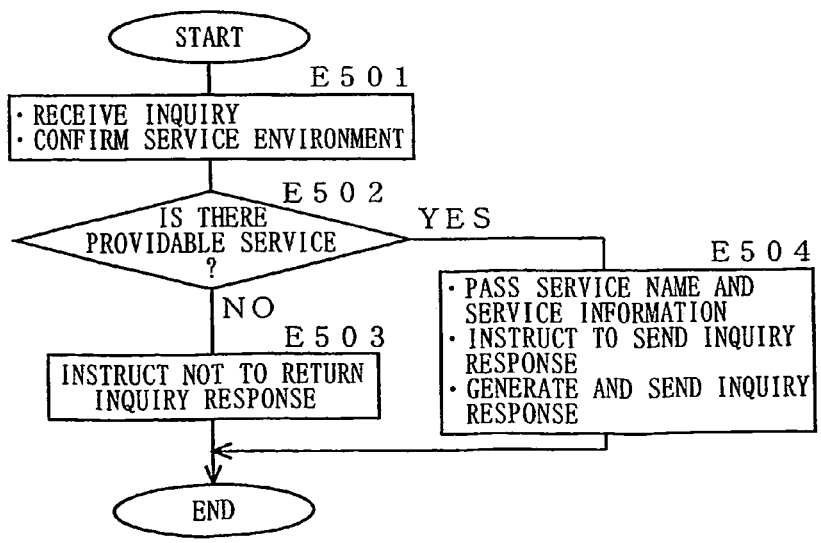
FIG. 12 is a flowchart illustrating an operation which is performed when a wireless communication link is established by the cellular phones 1a and 1b shown in FIG. 11.

FIG. 12 is a flowchart illustrating an operation which is performed when a wireless communication link is established by the cellular phones 1a and 1b shown in FIG. 11.

Hereinafter, with reference to FIGS. 11 and 12, the operation of the cellular phone 1a after receiving an inquiry will be described. Since the cellular phones 1a and 1b perform identical operations to each other, the description of the operation of the cellular phone 1b will be omitted.

Via the first antenna 10, the inquiry reception section 14 receives an inquiry which has been sent from a wireless headset 2 (as a source wireless communication device). Then, the inquiry reception section 14 notifies the receipt of an inquiry to the response control section 31. In response to the notification from the inquiry reception section 14, the response control section 31 asks the service provision confirmation section 32 as to which one of the service provision sections 33 to 35 is currently able to provide a service (step E501). In response to this asking by the service provision confirmation section 32, each of the service provision sections 33 to 35 investigates its own service provision environment, and notifies to the service provision confirmation section 32 whether it is currently able to provide a service or not (step E501). The service provision confirmation section 32 passes service provision information, which indicates which service is currently providable, to the response control section 31. The response control section 31 analyzes the service provision information to determine whether there is any currently providable service (step E502).

If it is determined that there is no currently providable service, the response control section 31 instructs the response transmission section 15 not to return an inquiry response, as in step A103 (step E503), thus ending the processing illustrated in FIG. 12. On the other hand, if it is determined that there is any currently providable service, the response control section 31 passes the name of the currently providable service (e.g., a profile name in Bluetooth technology) as currently-providable service information, as well as service environment information, to the response transmission section 15; furthermore, the response control section 31 instructs the response transmission section 15 to generate and send out an inquiry response. As used herein, the "service environment information" is information representing an environment for a destination device to provide a service, e.g., in the case where the name of the currently providable service is HSP (Headset Profile), the radiowaves reception state, communication speed, communication cost, and remaining battery power of the cellular phone which serves as a prospective destination. The details of the "service environment information" will be more specifically described later. In response to the instruction from the response control section 31, the response transmission section 15 generates an inquiry response which contains not only the BD address which is assigned to the cellular phone but also the service name and the service environment information received from the response control section 31, and sends out the generated inquiry response via the first antenna 10 (step E504).

Figure 13:
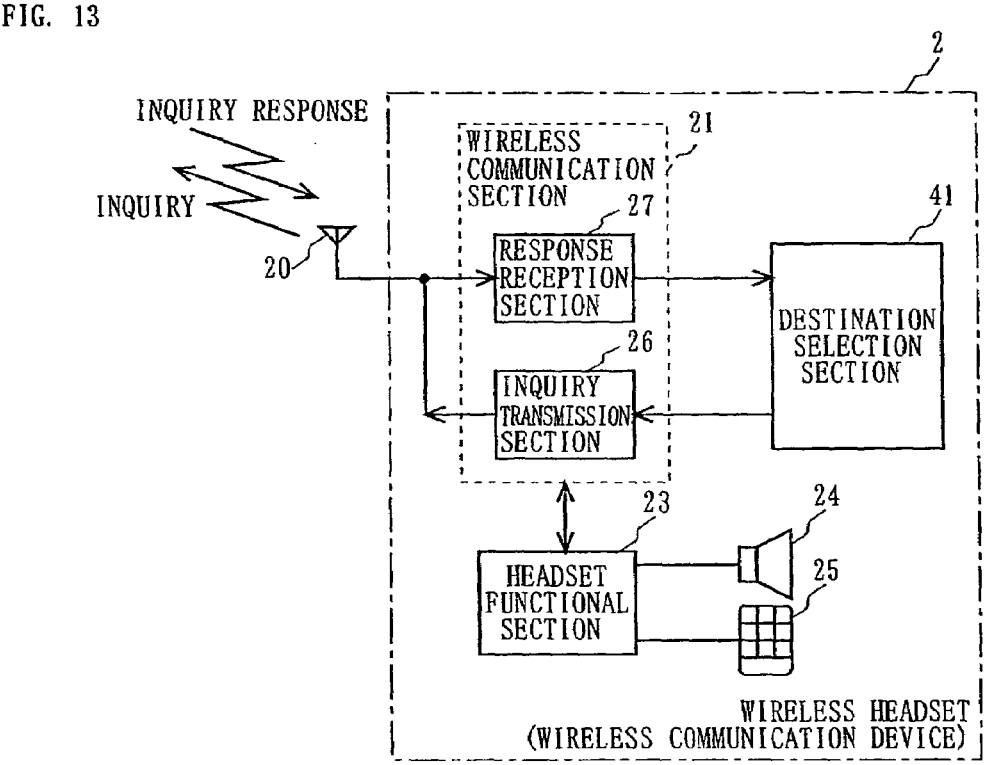
FIG. 13 is a block diagram illustrating the internal structure of a wireless headset 2 according to the second embodiment.

FIG. 13 is a block diagram illustrating the internal structure of the wireless headset 2 according to the second embodiment. Referring to FIG. 13, the wireless headset 2 differs from that of the first embodiment in that the wireless headset 2 of the second embodiment comprises a destination selection section 41 as means for enabling short-range wireless data communications, instead of a destination selection section 22. Otherwise, the wireless headset 2 according to the present embodiment is identical in structure to that of the first embodiment. Therefore, in FIG. 13, those elements which have their counterparts in FIG. 5 will be denoted by like numerals, and the descriptions thereof will be omitted.

Figure 14:
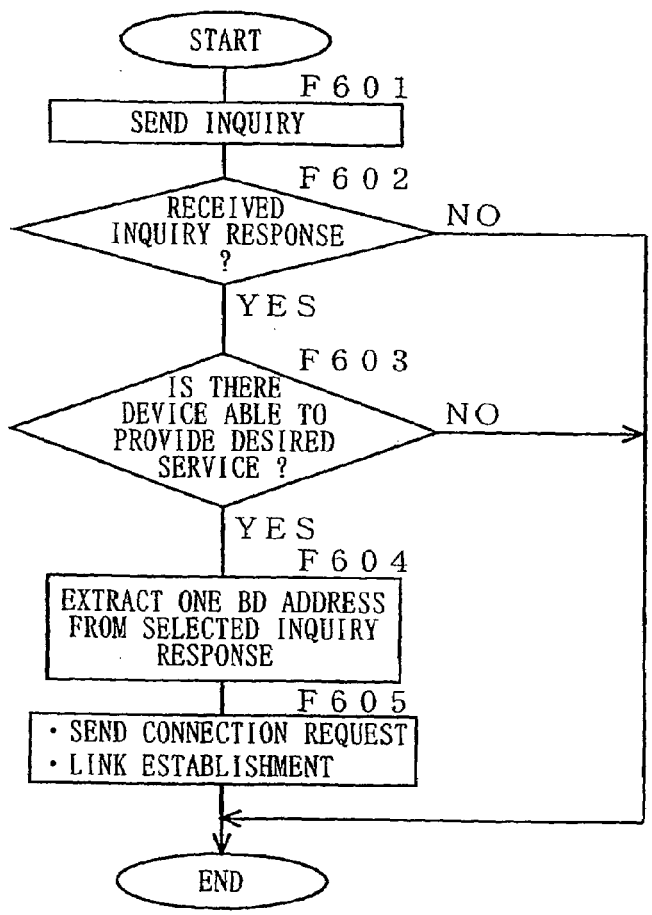
FIG. 14 is a flowchart illustrating an operation which is performed when a wireless communication link is established by the wireless headset 2 shown in FIG. 13.

FIG. 14 is a flowchart illustrating an operation which is performed when a wireless communication link is established by the wireless headset 2 shown in FIG. 13.

Hereinafter, with reference to FIGS. 13 and 14, the operation of the wireless headset 2 will be described.

The inquiry transmission section 26 sends out an inquiry, as in step B201 (step F601). Thereafter, each time an external inquiry response is received, the response reception section 27 passes the received inquiry response to the destination selection section 41.

If no inquiry response is received from the response reception section 27 during a predetermined period of waiting for an inquiry response (step F602), the destination selection section 41 ends the processing illustrated in FIG. 14. On the other hand, if one or more inquiry responses have been received, the destination selection section 41 determines whether an inquiry response from any wireless communication device which is able to provide a desired service can be found among the presently received inquiry responses, by relying on the name of the currently providable service which is set in each inquiry response.

If it is determined that there is no wireless communication device which is able to provide the desired service (step F603), the destination selection section 41 ends the processing illustrated in FIG. 14. For example, in the present embodiment, the service name desired by the wireless headset 2 is "HSP". Therefore, if "HSP" is set in none of the presently received inquiry responses, the destination selection section 41 ends the processing illustrated in FIG. 14.

On the other hand, if any inquiry response containing the desired service name is found (step F603), the destination selection section 41 selects one of the inquiry response(s)

thus found, and extracts the BD address from the selected inquiry response (step F604). Thereafter, the destination selection section 41 passes the extracted BD address to the wireless communication section 21, and instructs the wireless communication section 21 to establish a wireless communication link with the destination wireless communication device identified by the BD address. In response to this instruction, the wireless communication section 21 sends out a connection request containing the BD address as received from the destination selection section 41, via the antenna 20. Thereafter, the wireless headset 2 performs processes which are necessary for establishing a wireless communication link with the selected destination wireless communication device (step F605).

Figure 15:
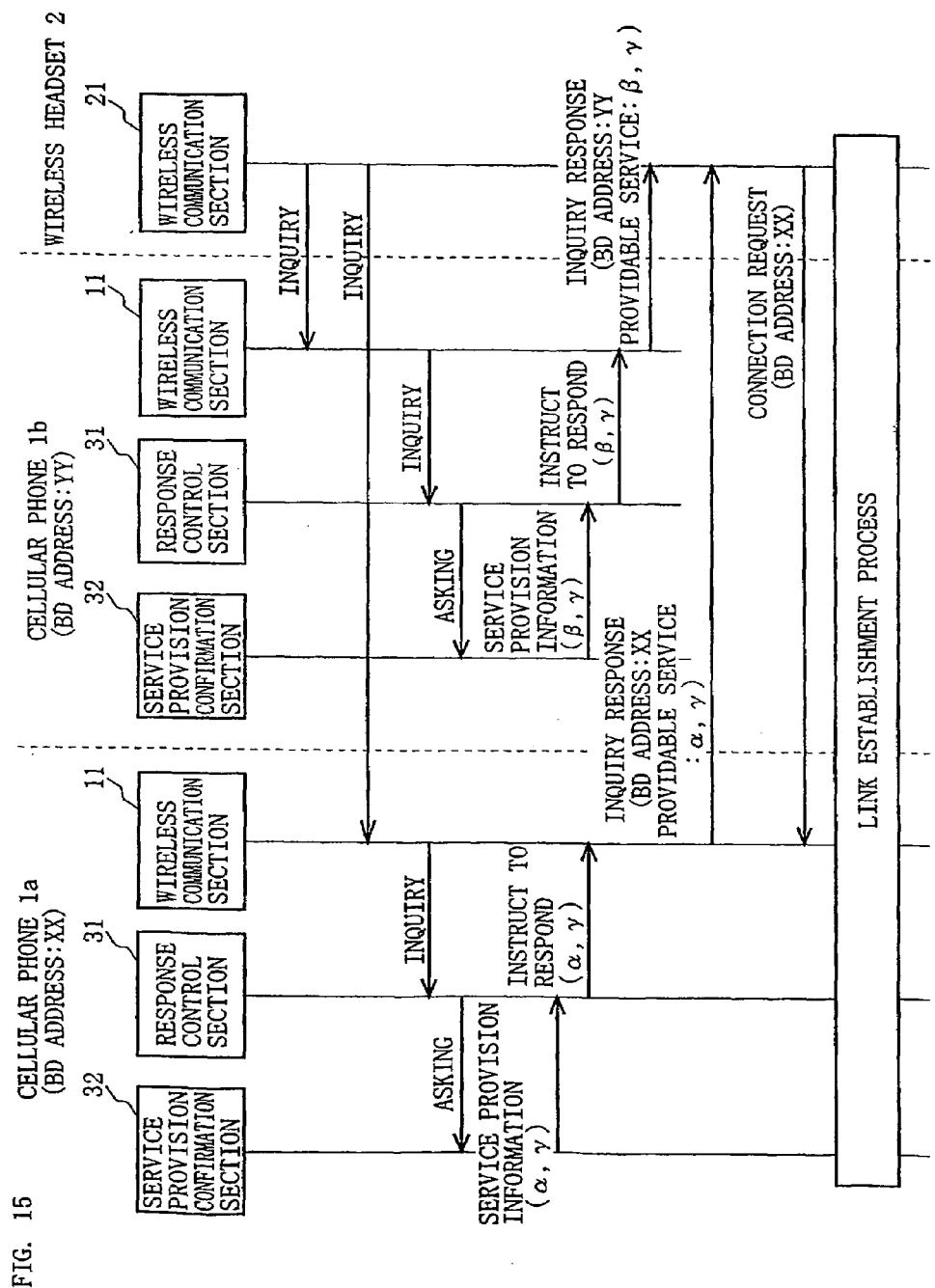
FIG. 15 is a sequence chart illustrating an establishment of a wireless communication link between each of the cellular phones 1a and 1b and the wireless headset 2 according to the second embodiment.

FIG. 15 is a sequence chart illustrating an establishment of a wireless communication link between each of the cellular phones 1*a* and 1*b* and the wireless headset 2 according to the second embodiment. In FIG. 15, it is assumed that the cellular phones 1*a* and 1*b* are capable of providing services α, β, and γ as a plurality of respectively different services. Furthermore, it is assumed that the wireless headset 2 desires to receive service α, i.e., the wireless headset 2 does not need services β and γ. Under this assumption, the wireless communication section 21 in the wireless headset 2 first sends out an inquiry to outside of the wireless headset 2. Assuming that both cellular phones 1*a* and 1*b* are located within a range for successfully receiving an inquiry from the wireless headset 2, the wireless communication section 11 of each of the cellular phones 1*a* and 1*b* receives the inquiry which has been transmitted from the wireless headset 2.

Thereafter, in each of the cellular phones 1*a* and 1*b*, the wireless communication section 11 passes the received inquiry to the response control section 31, as described above. Based on the service provision information from the service provision confirmation section 32, the response control section 31 instructs the response transmission section 15 whether or not to transmit an inquiry response, as described above. When instructing transmission of an inquiry response, the response control section 31 passes the name of the currently providable service to the wireless communication section 11. Herein, it is assumed that service names α and γ are currently providable at the cellular phone 1*a*, whereas service names β and γ are currently providable at the cellular phone 1*b*. Under this assumption, the wireless communication section 21 of the cellular phone 1*a* sends out an inquiry response at least containing the BD address "XX" and the currently providable service names α and γ, whereas the wireless communication section 21 of the cellular phone 1*b* sends out an inquiry response at least containing the BD address "YY" of the cellular phone 1*b* and the currently providable service names β and γ.

At the wireless headset 2, the wireless communication section 21 receives two inquiry responses to the inquiry which has been transmitted. However, through the processing illustrated in FIG. 14, the destination selection section 41 sends a connection request containing the BD address "XX" of the cellular phone 1*a* which is able to provide the desired service α, and a wireless communication link is established with the cellular phone 1*a*.

The procedure described in the above embodiment can provide the following advantages. According to the conventional procedure, the source wireless communication device would first establish a wireless connection with any wireless communication device, but such a destination wireless communication device may not be able to provide the service which is desired by the source device although this destination wireless communication device may be able to provide a service which is not even desired by the source device. In such a case, the source wireless communication device would need to establish a new wireless connection with another destination wireless communication device. In contrast, by establishing a wireless communication link according to the procedure described in the above embodiment, the wireless headset 2, as one example of a source wireless communication device, can perform a wireless connection with a wireless communication device which is able to provide the service which the wireless headset 2 desires, this being already possible through the first link establishment. Thus, it is possible to prevent link establishments from being made in vain.

FIG. 16A is a first schematic diagram illustrating the frame format of an FHS packet which is transmitted as an inquiry response by the cellular phone 1*a* or 1*b* shown in FIG. 11. As shown in FIG. 16A, the FHS packet contains a "Class of device" field. The "Class of device" field includes a "Format type" field, in which "00" is conventionally assigned. According to the present embodiment, however, "01" is assigned for the "Format type" field. As a result, a new frame format is defined for the "Class of device" field. In the "Class of device" field thus newly defined, a 6 bit-field "Profile" is a field for setting a service (e.g., a profile) which the wireless communication device is able to provide. As shown in FIG. 16B, an ID which is defined for each service is set in the "Profile" field. The field named "reserved" is an unused field. The 1 bit-field "SF" is as described in the first embodiment above. Furthermore, the service information which has been notified from the service provision confirmation section 32 is stored in the "Service Information" field. The service information is an item which depends on the providable service. Typical examples of service environment information for HSP (Headset Profile) are: terminal type, radiowave reception state, communication speed, communication cost, and remaining battery power. Other examples of service environment information may be the processing power of the processor mounted in the wireless communication device. As the terminal type, for example, a 2 bit-value designating either "cellular phone", "PDA", or "PC" is set. As the radiowave reception state, for example, a 2 bit-value designating either "weak", "medium", "strong", or "cable connection" is set. As the communication speed, a 2 bit-value designating either "9.6 kbps or less", "up to 32 kbps", "up to 128 kbps", or "up to 720 kbps" is set. As the communication cost, a 3 bit-value designating one of eight different fees, e.g., "¥10/min. or less", "¥10/min.", etc., . . . "¥120/min. or more" is set. As the remaining battery power, a 2 bit-value designating either "little", "medium", "full", or "AC" is set.

In the case where there is a plurality of currently providable services, the wireless communication device transmits as many inquiry responses as there are currently providable services, while each time rewriting the "Profile" and "Service Information" fields. An alternative manner of issuing an inquiry response in the case where there is a plurality of services currently providable by the wireless communication device is illustrated in FIG. 16C, where the wireless communication device appends, after an FHS packet which is transmitted as an inquiry response, a data sequence including a field "N" representing the number of currently providable services followed by as many sets of the "Profile" and "Service Information" fields as there are currently providable services.

Since each destination wireless communication device adds service environment information as described above, the source wireless communication device is enabled to select the best destination for itself when a plurality of inquiry responses are received. For example, this makes it possible for the source wireless communication device to automatically establish a wireless connection with a wireless communication device having the lowest communication cost. Since the source wireless communication device automatically selects a destination wireless communication device, the operational burden on the user is reduced.

Figure 17:
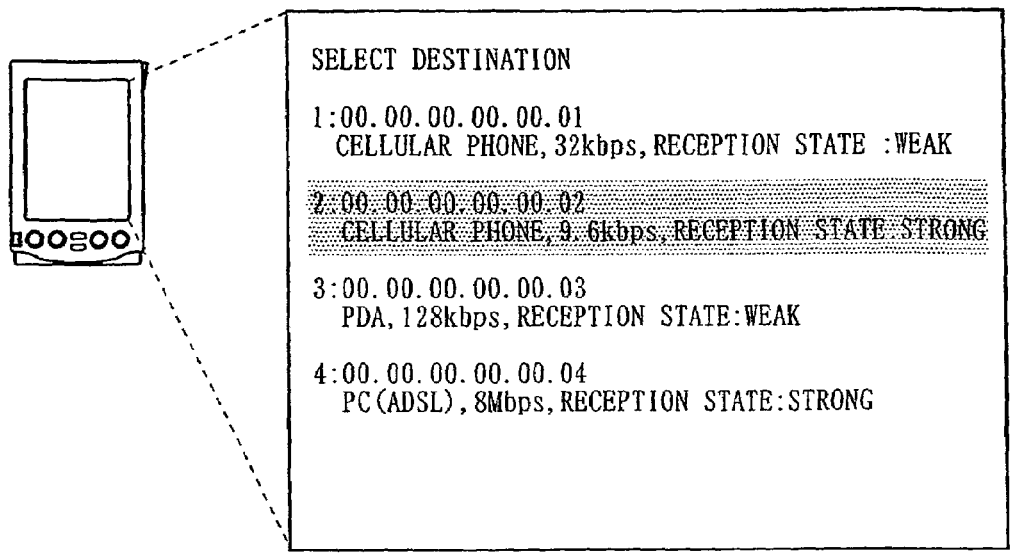
FIG. 17 is a schematic diagram illustrating an exemplary displayed image of the profile and service information shown in FIG. 16A or FIG. 16C.

Although the present embodiment illustrates the wireless headset 2 as a source device, a wireless communication device having a display device such as a PDA (Personal Digital Assistant) may be employed, as shown in FIG. 17. In this case, by displaying the service names and service information on the display device, the user may be allowed to choose a destination device on his or her own will.

Third Embodiment

In the first embodiment, the wireless headset 2 as one example of a source wireless communication device transmits an inquiry in order to ascertain whether any cellular phone as a destination wireless communication device is present in its neighborhood. In the present embodiment, as a variant of the first embodiment, the wireless headset 2 transmits an inquiry designating a requested service, in order to ascertain whether a wireless communication device which is able to provide a service requested by the wireless headset 2 is present in its neighborhood.

In the present embodiment, the overall configuration of the wireless communication system is identical to that in the first embodiment (FIG. 1). Therefore, any diagrammatic illustration of the wireless communication system according to the present embodiment will be omitted.

Figure 18:
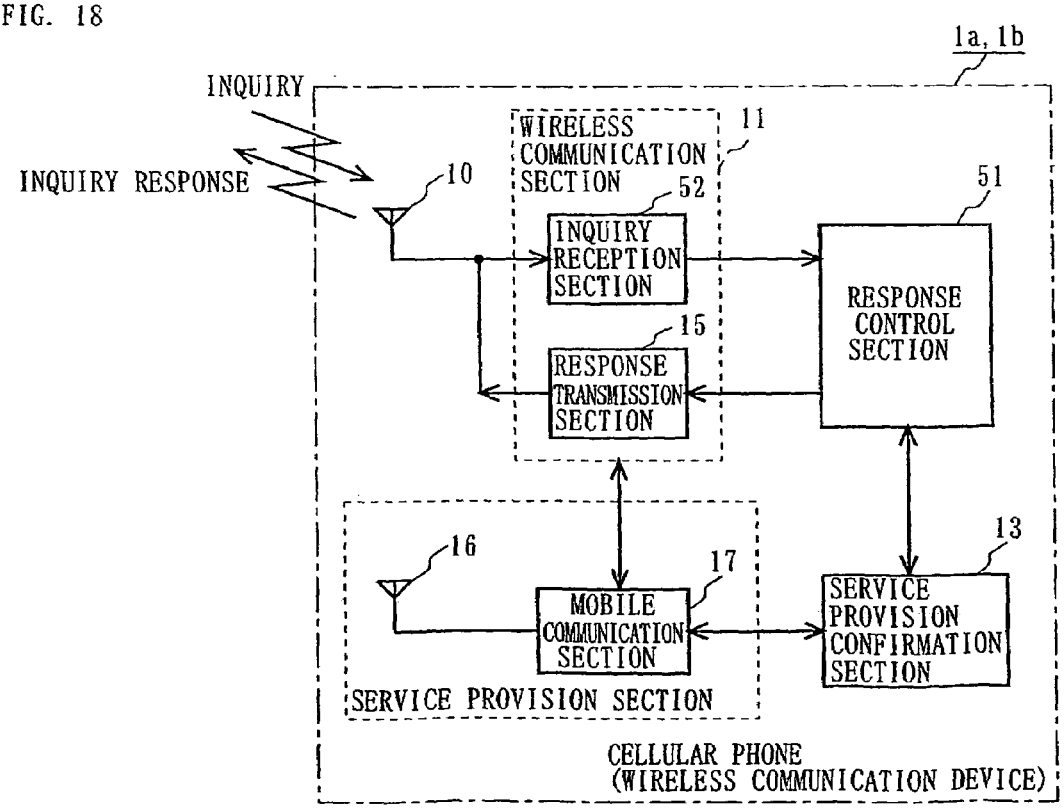
FIG. 18 is a block diagram illustrating the internal structure of cellular phones 1a and 1b as wireless communication devices according to a third embodiment of the present invention.

FIG. 18 is a block diagram illustrating the internal structure of cellular phones 1*a* and 1*b* as wireless communication devices according to the third embodiment of the present invention. In the present embodiment, it is also assumed that the cellular phones 1*a* and 1*b* have the same internal structure, and only the internal structure of the cellular phone 1*a* will be referred to in the following description. Referring to FIG. 18, the cellular phone 1*a* differs from that of the first embodiment in that the cellular phone 1*a* of the third embodiment comprises a response control section 51 and a inquiry reception section 52 as means for enabling short-range wireless data communications, instead of a response control section 12 and an inquiry reception section 14. Otherwise, the cellular phones 1*a* and 1*b* according to the present embodiment are identical in structure to those of the first embodiment. Therefore, in FIG. 18, those elements which have their counterparts in FIG. 3 will be denoted by like numerals, and the descriptions thereof will be omitted FIG. 19 is a flowchart illustrating an operation which is performed when a wireless communication link is established by the cellular phones 1*a* and 1*b* shown in FIG. 18.

Hereinafter, with reference to FIGS. 18 and 19, the operation of the cellular phone 1*a* after receiving an inquiry will be described. Since the cellular phones 1*a* and 1*b* perform identical operations to each other, the description of the operation of the cellular phone 1*b* will be omitted.

Figure 19:
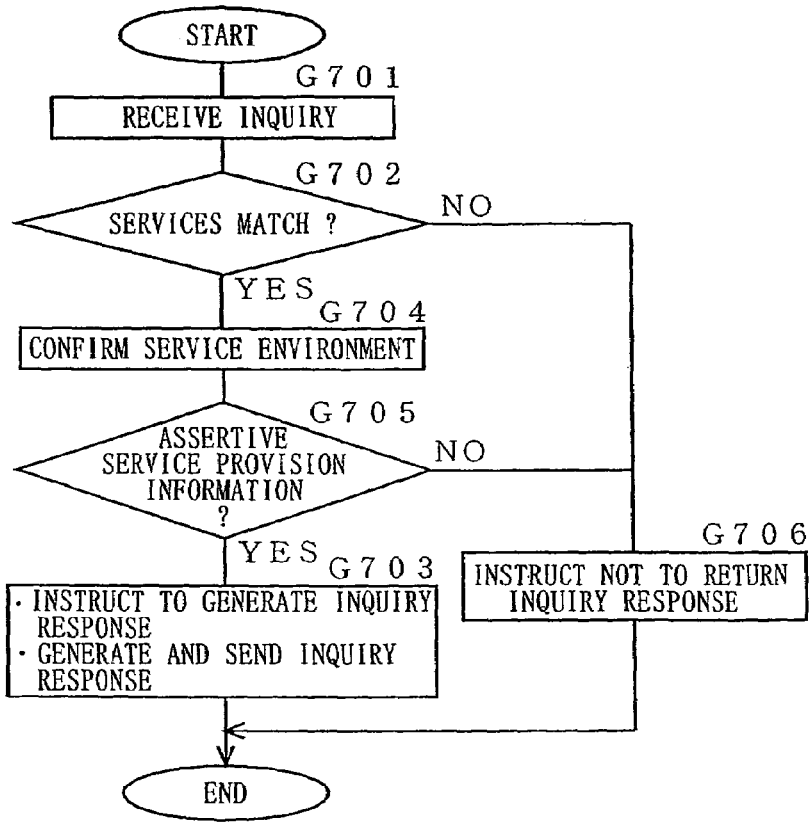
FIG. 19 is a flowchart illustrating an operation which is performed when a wireless communication link is established by the cellular phones 1a and 1b shown in FIG. 18.

As described earlier, the inquiry reception section 52 receives an inquiry from the wireless headset 2 as a source wireless communication device (FIG. 19; step G701). As will be made clear from the description below, the inquiry contains information (hereinafter referred to as "requested service information") which designates a service which is currently requested by the wireless headset 2. After receiving an inquiry, the inquiry reception section 52 extracts the requested service information contained in the presently received inquiry, and passes the requested service information to the response control section 51. The response control section 51 previously stores information concerning the service(s) which a wireless communication device incorporating the response control section 51 is able to provide, and upon receiving the requested service information, determines whether the service which is designated in the received requested service information matches any of the services stored in the response control section 51 (step G702). If no matching service is found, the response control section 51 instructs the response transmission section 15 not to return an inquiry response (step G706), thus ending the processing illustrated in FIG. 19.

On the other hand, if a matching service is found, the response control section 51 asks the service provision confirmation section 13 whether the mobile communication section 17 is currently able to provide the desired service, as in step A101. In the same manner as in the first embodiment, the service provision confirmation section 13 checks the service provision environment with respect to the service which is designated in the received requested service information, and passes assertive or negative service provision information to the response control section 51 (step G704).

The response control section 51 determines whether assertive service provision information has been received, as in step A102 (step G705). If negative service provision information has been received, the response control section 51 performs the aforementioned step G706, and thereafter ends the processing illustrated in FIG. 19. Otherwise, the response control section 51 instructs the response transmission section 15 to generate and send out an inquiry response, as in step A104. The response transmission section 15 generates and sends out an inquiry response as instructed (step G703).

Figure 20:
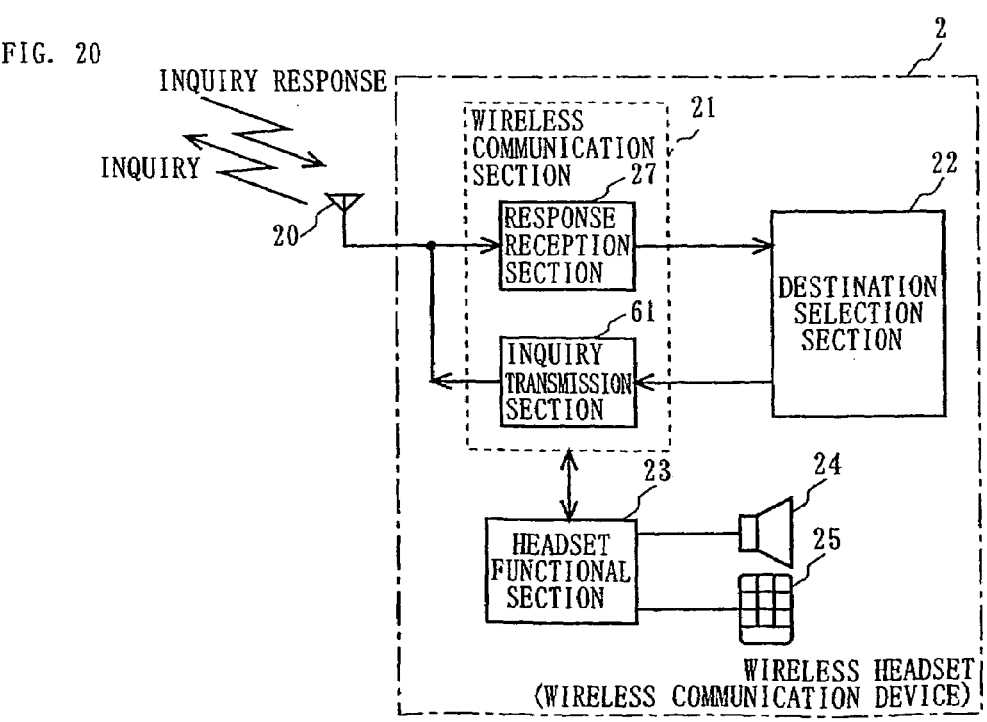
FIG. 20 is a block diagram illustrating the internal structure of a wireless headset 2 according to the third embodiment.

FIG. 20 is a block diagram illustrating the internal structure of the wireless headset 2 according to the third embodiment. Referring to FIG. 20, the wireless headset 2 differs from that of the first embodiment in that the wireless headset 2 of the present embodiment comprises an inquiry transmission section 61, instead of an inquiry transmission section 26. Otherwise, the wireless headset 2 according to the present embodiment is identical in structure to that of the first embodiment. Therefore, in FIG. 20, those elements which have their counterparts in FIG. 5 will be denoted by like numerals, and the descriptions thereof will be omitted.

Figure 21:
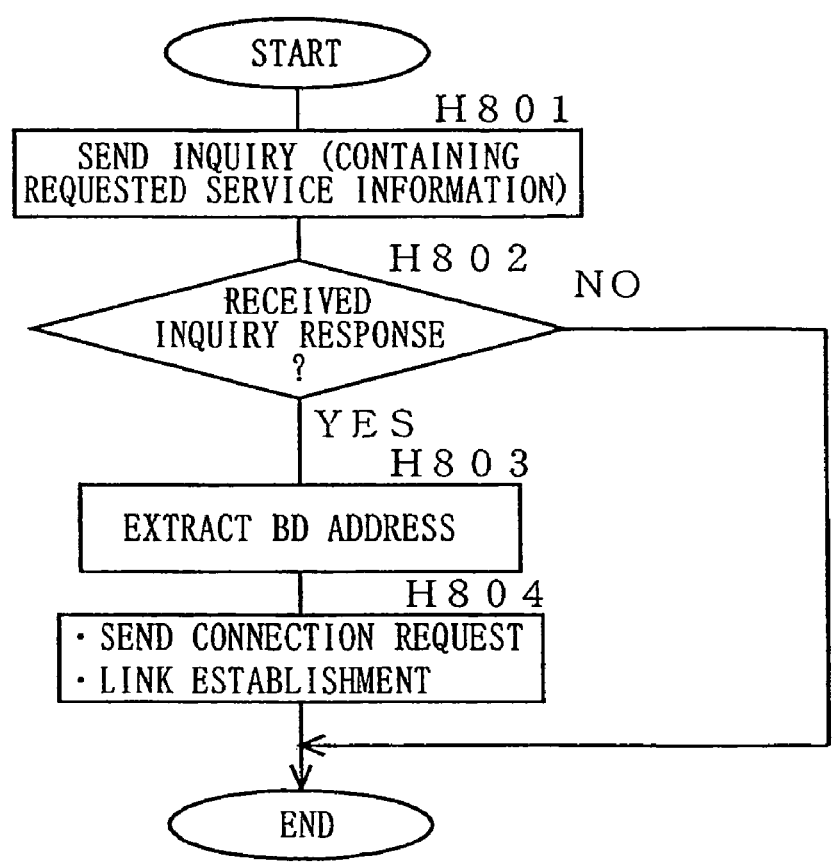
FIG. 21 is a flowchart illustrating an operation which is performed when a wireless communication link is established by the wireless headset 2 shown in FIG. 20.

FIG. 21 is a flowchart illustrating an operation which is performed when a wireless communication link is established by the wireless headset 2 shown in FIG. 20.

Hereinafter, with reference to FIGS. 20 and 21, the operation of the wireless headset 2 will be described.

First, via the antenna 20, the inquiry transmission section 61 generates and sends out an inquiry containing requested service information from the wireless headset 2 (FIG. 21; step H801). Thereafter, the wireless headset 2 performs processes similar to those of steps B202 to B204 described above (step H802 to H804).

FIG. 22 is a sequence chart illustrating an establishment of a wireless communication link between each of the cellular phones 1*a* and 1*b* and the wireless headset 2 according to the third embodiment. In FIG. 22, it is assumed that the wireless headset 2 is requesting an HSP (Headset Profile) as service α. Under this assumption, the wireless communication section 21 first sends out an inquiry, containing requested service information which designates service α, to outside of the wireless headset 2. Assuming that both of the cellular phones 1a and 1b are located in the neighborhood of the wireless headset 2, the wireless communication section 11 in each of the cellular phones 1a and 1b receives the inquiry which has been transmitted from the wireless headset 2. Thereafter, in the cellular phones 1a and 1b, the wireless communication section 11 passes the requested service information, which has been extracted from the received inquiry, to the response control section 51, as described above. Since the cellular phone 1a is located within the call range and assuming that the cellular phone 1a is the only cellular phone that is able to provide service α, the response control section 51 in the cellular phone 1a finds that the service α stored therein matches that which is indicated by the requested service information, so that assertive service provision information is generated. Therefore, an inquiry response containing the BD address "XX" of the cellular phone 1a is sent out from the wireless communication section 11. On the other hand, in the cellular phone 1b which is assumed to be unable to provide service α, the response control section 51 instructs the wireless communication section 11 not to transmit an inquiry response, without even asking the service provision confirmation section 13.

In the wireless headset 2, the wireless communication section 21 only receives an inquiry response with the BD address "XX" in response to the inquiry which the wireless headset 2 has transmitted. Therefore, the wireless communication section 21 sends out a connection request containing the BD address "XX" to the cellular phone 1a, and thereafter establishes a wireless communication link with the cellular phone 1a.

Thus, since the source wireless communication device adds requested service information as described above, the destination wireless communication device refrains from sending out an inquiry response if a service is being requested which the destination wireless communication device does not provide. As a result, the chances of the source wireless communication device making any link establishments in vain are reduced, and the source wireless communication device is guaranteed to receive the requested service from the destination wireless communication device to which the source wireless destination device is connected. Since the source wireless communication device automatically selects a destination wireless communication device, the operational burden on the user is reduced.

Figures 23A, 23B, 23C:
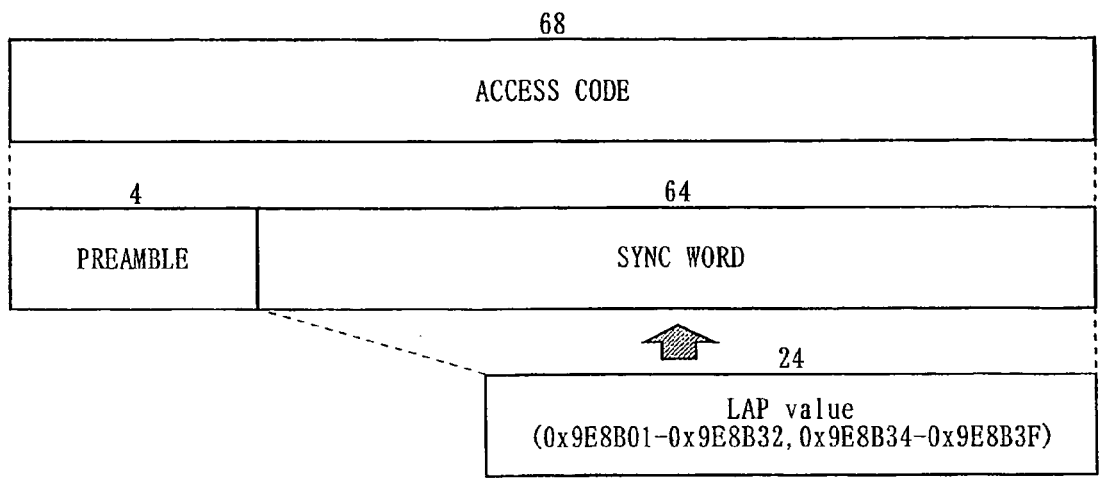
FIG. 23A is a schematic diagram illustrating the frame format of a POLL packet which is transmitted as an inquiry by the wireless headset 2 shown in FIG. 20.
FIG. 23B is a schematic diagram illustrating several examples of a "LAP value" shown in FIG. 23A.
FIG. 23C is a schematic diagram illustrating other examples of the "LAP value" shown in FIG. 23B.

FIG. 23A is a schematic diagram illustrating the frame format of a POLL packet which is transmitted as an inquiry by the wireless headset 2 shown in FIG. 20. As shown in FIG. 23A, the POLL packet includes an "ACCESS CODE" field. The "ACCESS CODE" field includes a "SYNC WORD" field, in which "SYNC WORD" is set; "SYNC WORD" is generated by subjecting a "LAP value", representing a service requested by the source wireless communication device (e.g., a profile name), to a predetermined logical operation.

FIG. 23B is a schematic diagram illustrating several examples of "LAP values" which are predefined for different services. In FIG. 23B, "0x9E8B01" is assigned to the profile name LAN (Local Area Network). "0x9E8B02" is assigned to DUP (Dial Up Network). "0x9E8B03" and "0x9E8B04" are assigned to the aforementioned HSP and FAX(Facsimile), respectively.

The above embodiment illustrates an example where the inquiry contains requested service information. Alternatively, the source wireless communication device may include "supported service information", i.e., information concerning a plurality of services which the source wireless communication device supports, in the inquiry. For example, as shown in FIG. 23C, "0x9E8B03" may be assigned to both profile names "LAN" and "DUP". Thus, the source wireless communication device can notify the destination wireless communication device that the source wireless communication device supports the plurality of services (i.e., LAN and DUP), and accordingly search for a wireless communication device(s) which is able to provide these services.

Fourth Embodiment

The second embodiment illustrates an example where, when the wireless headset 2 receives inquiry responses from a plurality of cellular phones (1a and 1b), the destination selection section 41 (see FIG. 13) selects one of the plurality of wireless communication device which are prospective destinations (i.e., the cellular phones 1a and 1b). The fourth embodiment will illustrate an exemplary method by which the source wireless communication device selects a destination.

Figure 24:
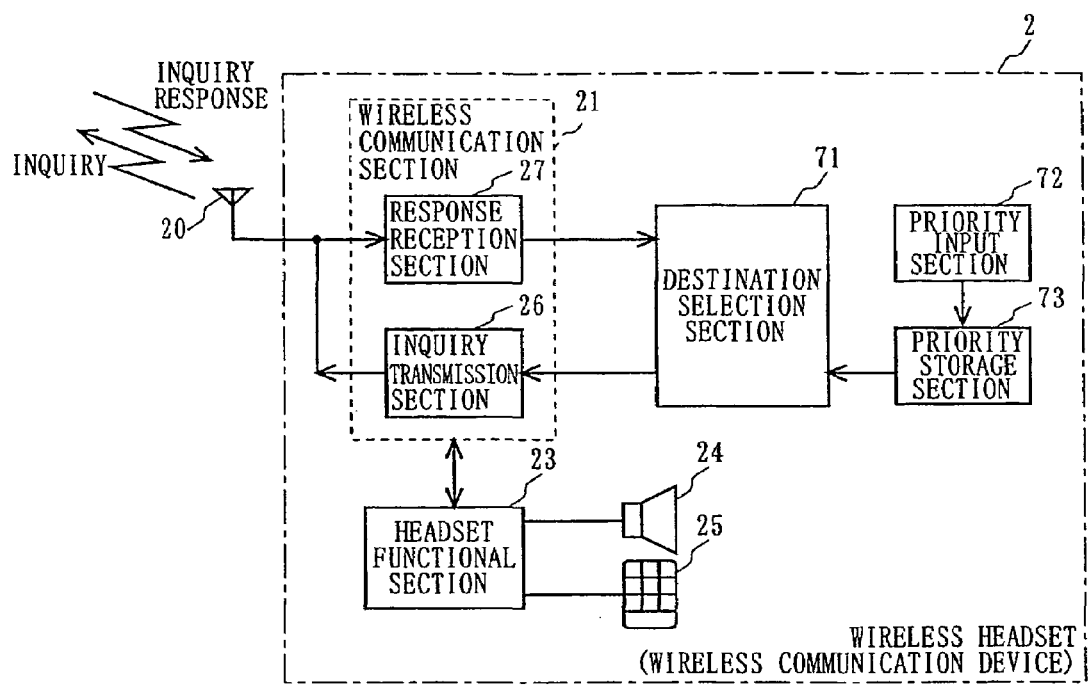
FIG. 24 is a block diagram illustrating the internal structure of a wireless headset 2 according to a fourth embodiment of the present invention.

FIG. 24 is a block diagram illustrating the internal structure of a wireless headset 2 according to a fourth embodiment of the present invention. Referring to FIG. 24, the wireless headset 2 differs from that of the second embodiment in that the wireless headset 2 of the present embodiment comprises a destination selection section 71 instead of a destination selection section 41, and that the wireless headset 2 of the present embodiment further comprises a priority input section 72 and a priority storage section 73. Otherwise, the wireless headset 2 according to the present embodiment is identical in structure to that of the second embodiment. Therefore, in FIG. 24, those elements which have their counterparts in FIG. 13 will be denoted by like numerals, and the descriptions thereof will be omitted.

Figure 25:
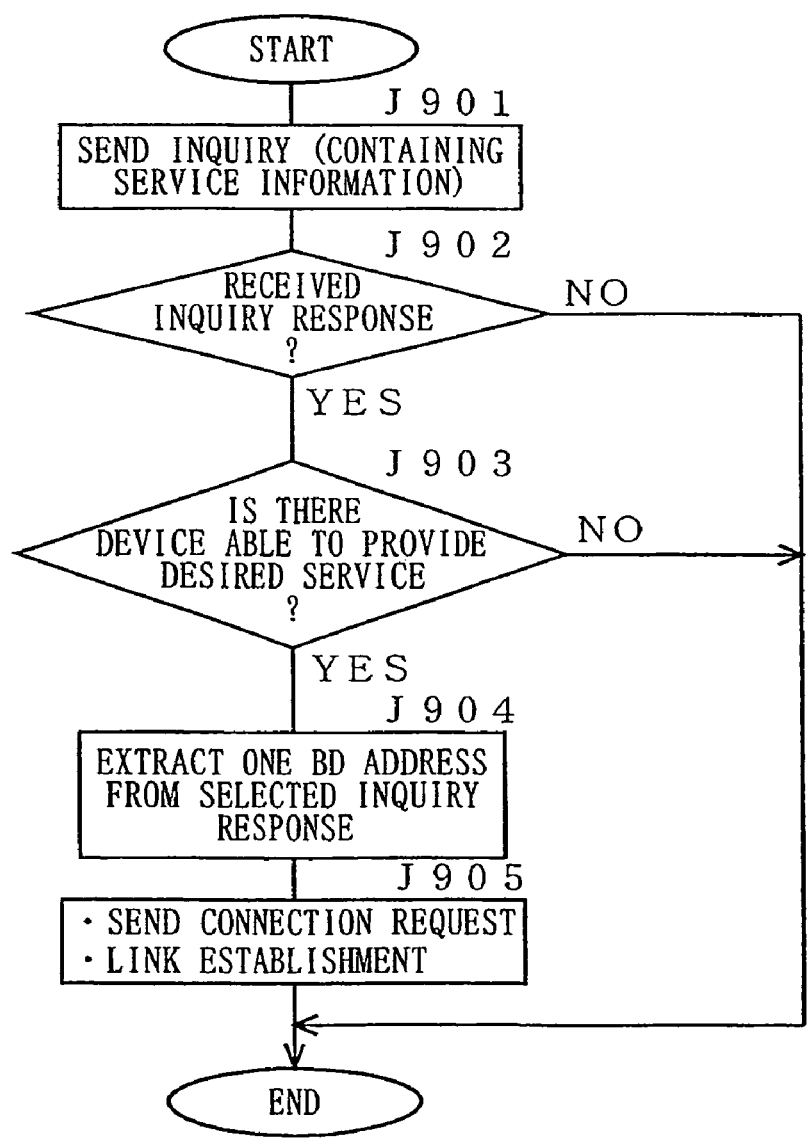
FIG. 25 is a flowchart illustrating an operation which is performed when a wireless communication link is established by the wireless headset 2 shown in FIG. 24.
Figure 28A:
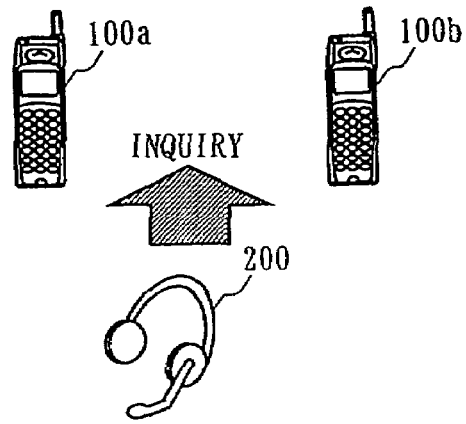
FIG. 28A is a schematic diagram illustrating an initial stage of a wireless connection established between Bluetooth-compliant wireless communication devices.
Figure 28B:
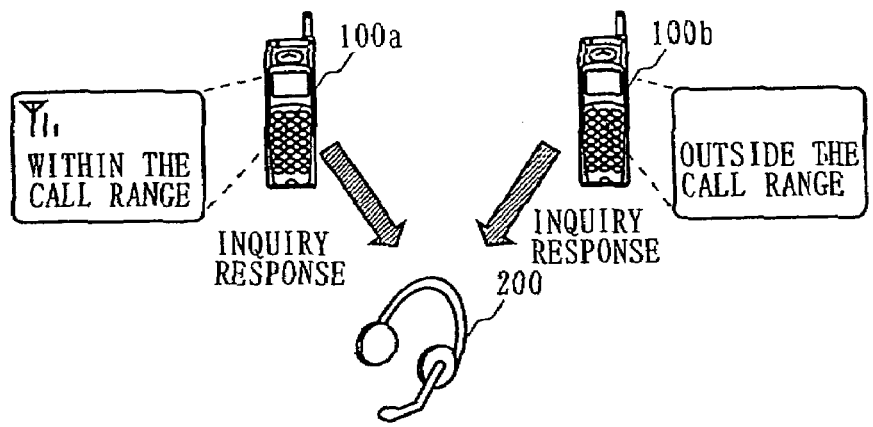
FIG. 28B is a schematic diagram illustrating an intermediate stage of a wireless connection established between Bluetooth-compliant wireless communication devices.
Figure 28C:
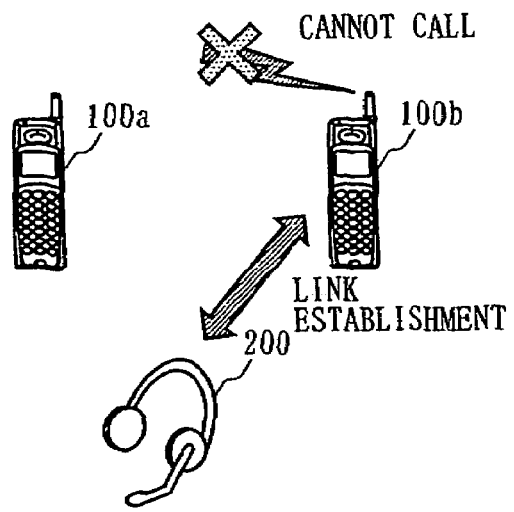
FIG. 28C is a schematic diagram illustrating a final stage of a wireless connection established between Bluetooth-compliant wireless communication devices.
Figure 29:
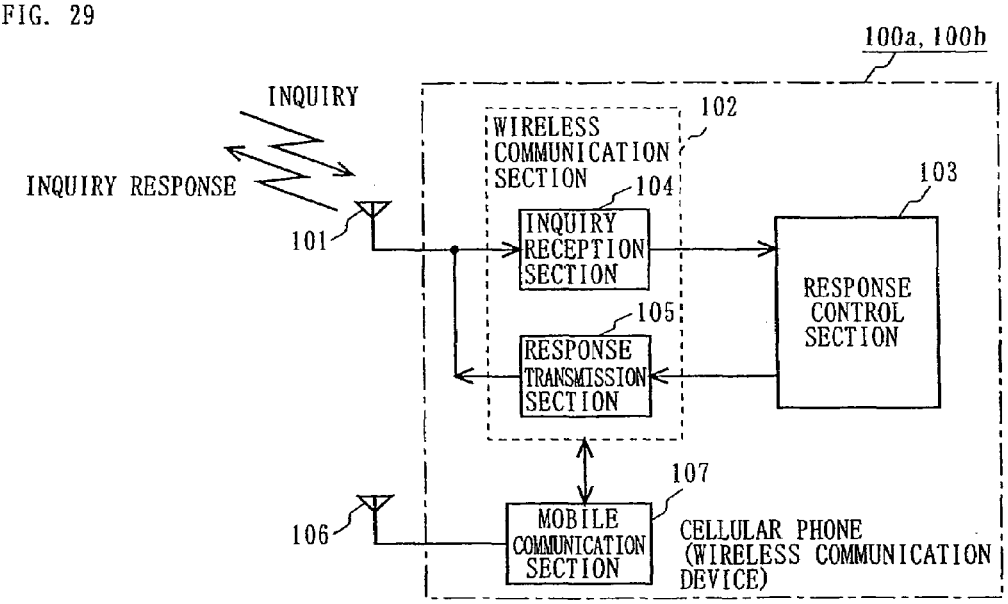
FIG. 29 is a block diagram illustrating the structure of each of cellular phones 100a and 100b shown in FIG. 28A to FIG. 28C.
Figure 30:
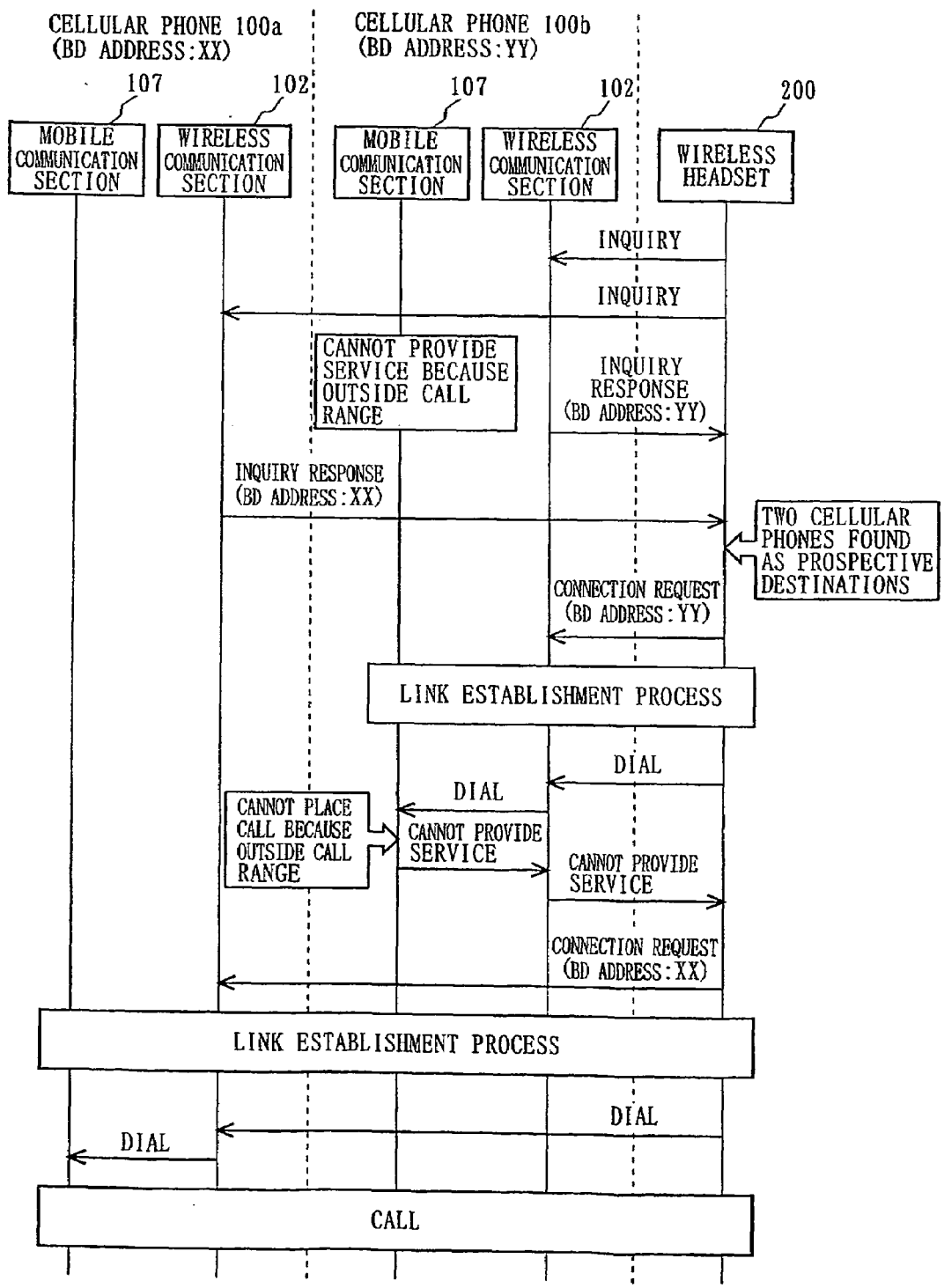
FIG. 30 is a sequence chart illustrating the specific process performed by the cellular phone 100a or 100b shown in FIG. 28A to FIG. 28C.

FIG. 25 is a flowchart illustrating an operation which is performed when a wireless communication link is established by the wireless headset 2 shown in FIG. 24.

FIGS. 26A and 26B are schematic diagrams illustrating examples of priority information which is inputted by the priority input section 72 and stored in the priority storage section 73. In the exemplary priority information shown in FIG. 26A, an item type is assigned for each priority level. For example, an item type "reception state" is assigned for the priority level "1". For the priority levels "2", "3", "4", and "5", "communication cost", "remaining battery power", "communication speed", and "terminal type" are assigned, respectively. In accordance with the exemplary priority information shown in FIG. 26A, if there is a plurality of prospective destinations, the source wireless communication device connects to one of the prospective destinations that has the best reception state. If a plurality of prospective destinations have the same reception state, the source wireless communication device connects to the prospective destination that has the lowest communication cost. Henceforth, the source wireless communication device will select a destination while giving priority to the remaining battery power, then to the communication speed, and then to the terminal type, and so on.

In the exemplary priority information shown in FIG. 26B, a terminal type is assigned for each priority level. For example, "PC (IP telephone)", "stationary telephone", "PHS (Personal Handyphone System)", and "cellular phone" are assigned for the priority levels "1", 2", "3", and "4", respectively. In accordance with the exemplary priority information shown in FIG. 26B, if there is a plurality of prospective destinations, the source wireless communication device connects to any one of them that is a PC. If none of the prospective destinations is a PC, the source wireless communication device connects to anyone of them that is a stationary telephone. Henceforth, the source wireless communication device will select a destination while giving priority to PHSs, and then to cellular phones, and so on.

FIG. 27 is a schematic diagram illustrating a table of service information (see FIG. 16A to FIG. 16C) contained in an inquiry sent from a wireless communication device serving as a prospective destination. In FIG. 27, in the exemplary service information from a cellular phone 1*a* serving as a prospective destination, "strong", "¥ 20/min.", "full", "64 kbps", and "cellular phone" are respectively set for the five items: reception state, communication cost, remaining battery power, communication speed, and terminal type. In the exemplary service information from a cellular phone 1*b* serving as another prospective destination, "strong", "¥10/min.", "little", "32 kbps", and "cellular phone" are respectively set for the same five items.

Hereinafter, the operation of the wireless headset 2 will be described with reference to FIGS. 24 to 27.

First, before the wireless headset 2 performs a wireless connection process, the priority levels associated with item types and the priority levels associated with terminal types are inputted to the priority input section 72. In accordance with the inputted priority levels, priority information as shown in FIG. 26A or FIG. 26B is stored to the priority storage section 73.

As one example, the priority input section 72 may be implemented by providing the wireless headset 2 with a dip switch for setting priority levels. Alternatively, the user may create a priority setting file on another wireless communication device (e.g., a PDA), transmit the setting file by using a SPP (Serial Port Profile) of the Bluetooth protocol, and the wireless headset 2 may then generate priority information in accordance with the received setting file, and store the generated priority information to the priority storage section 73.

Preferably, the priority storage section 73 is made of a non-volatile memory, so as to be capable of allowing rewriting of priority information therein, and yet retaining priority information even after the wireless headset 2 itself is turned off.

After the priority information has been thus stored, in accordance with the processing procedure as shown in FIG. 25, the wireless headset 2 establishes a wireless communication link. In other words, the inquiry transmission section 26 sends out an inquiry, as in step B201 (step J901). Thereafter, each time an inquiry response (see FIGS. 16A to 16C) containing service information is externally received, the response reception section 27 passes the received inquiry response to the destination selection section 71.

If no inquiry response is from the response reception section 27 during a predetermined period of waiting for an inquiry response (step J902), the destination selection section 71 ends the processing illustrated in FIG. 25. On the other hand, if one or more inquiry responses have been received, the destination selection section 71 checks whether an inquiry response from a wireless communication device which is able to provide the desired service can be found among the presently received inquiry responses, as in step F603.

If it is determined that there is no wireless communication device which is able to provide the desired service (step J903), the destination selection section 71 ends the processing illustrated in FIG. 25. On the other hand, if it is determined that there is an inquiry response containing the desired service name (step J903), the destination selection section 71 selects an inquiry response having the highest priority in view of the priority information stored in the priority information storage section 73 and the service information contained in the presently found inquiry response, and extracts the BD address from the selected inquiry response (step J904). Let us assume that two inquiry responses have reached the wireless headset 2, and that one of the two inquiry responses is from the cellular phone 1*a* and contains service information as shown in the left column of FIG. 27, and the other inquiry response is from the cellular phone 1*b* and contains service information as shown in the right column of FIG. 27. It is further assumed that the priority storage section 73 stores priority information as shown in FIG. 26A. Under these assumptions, the destination selection section 71 sees that the reception state is good in both cellular phones 1*a* and 1*b*, and therefore selects the cellular phone 1*b*, which has a lower communication cost, as the destination.

After step J904 above, the destination selection section 71 instructs establishing a wireless communication link with the selected destination wireless communication device, as in step F605. As instructed by the destination selection section 71, the wireless communication section 21 generates and sends out a connection request. Thereafter, the wireless headset 2 performs processes which are necessary for establishing a wireless communication link with the selected destination wireless communication device (step J905).

Through the procedure described in the above embodiment, even if a plurality of prospective destination wireless communication device is present, the wireless headset 2 as a source wireless communication device can automatically establish a wireless connection with the wireless communication device having the highest priority for itself. Since the source wireless communication device automatically selects a destination wireless communication device, the operational burden on the user is reduced.

While the present invention has been described in detail, the foregoing description is in all aspects illustrative and not restrictive. It is understood that numerous other modifications and variations can be devised without departing from the scope of the present invention.

INDUSTRIAL APPLICABILITY

The wireless communication system according to the present invention is applicable to any wireless communication device or the like which establishes a wireless communication link with a destination wireless communication device that is able to provide a service.

The invention claimed is:

1. A wireless communication device, for use as a destination wireless communication device to which a wireless communication link from a source wireless communication device is to be established, operable to provide a service selected from among at least one category of services for the source wireless communication device via the wireless communication link, said wireless communication device comprising:

at least one service provision section operable to provide a service after the wireless communication link is established, the service being provided by data communication via the established wireless communication link;

a wireless communication section operable to receive an inquiry, which is sent from the source wireless communication device and contains service information representing a service which is requested by the source wireless communication device, before the wireless communication link is established;

a first determination section operable to determine whether or not the service requested in the inquiry received by said wireless communication section matches a service provided by said at least one service provision section; and a second determination section is operable to determine whether or not said at least one service provision section is currently able to provide the requested service, based on a current service provision environment concerning said at least one service provision section, wherein only when it is determined, based on the determination results of said first and second determination sections, that said at least one service provision section is currently able to provide the requested service, said wireless communication section is operable to send out an inquiry response, which represents that it is determined that the requested service is providable, to the presently received inquiry.

2. The wireless communication device according to claim 1, wherein the inquiry response sent out by said wireless communication section contains currently-providable service information representing a service which said at least one service provision section is currently able to provide.

3. The wireless communication device according to claim 2, wherein:

after establishing the wireless communication link, said destination wireless communication device is operable to send data acquired from a remote device to the source wireless communication device, and said at least one service provision environment at least includes an environment for a communication between said destination wireless communication device and the remote device.

4. The wireless communication device according to claim 3, wherein the service environment information at least comprises one selected from the group consisting of a type of said destination wireless communication device, a reception state of radiowaves at said destination wireless communication device, a communication speed and communication cost of said destination wireless communication device, and remaining battery power of a battery and processing power of a processor incorporated in said destination wireless communication device.

* * * * *